(12) United States Patent
Okamura et al.

(10) Patent No.: US 11,167,731 B2
(45) Date of Patent: Nov. 9, 2021

(54) IMAGING DEVICE FOR VEHICLE, LIGHTING DEVICE FOR VEHICLE AND FOREIGN SUBSTANCE REMOVAL SYSTEM FOR VEHICLE

(71) Applicant: KOITO MANUFACTURING CO., LTD., Tokyo (JP)

(72) Inventors: Toshihiro Okamura, Shizuoka (JP); Naoki Tatara, Shizuoka (JP); Akinobu Kubota, Shizuoka (JP)

(73) Assignee: KOITO MANUFACIURING CO., LTD., Tokyo (JP)

( * ) Notice: Subject to any disclaimer, the term of this patent is extended or adjusted under 35 U.S.C. 154(b) by 362 days.

(21) Appl. No.: 16/085,182

(22) PCT Filed: Mar. 14, 2017

(86) PCT No.: PCT/JP2017/010262
§ 371 (c)(1),
(2) Date: Sep. 14, 2018

(87) PCT Pub. No.: WO2017/159697
PCT Pub. Date: Sep. 21, 2017

(65) Prior Publication Data
US 2019/0086773 A1    Mar. 21, 2019

(30) Foreign Application Priority Data

Mar. 16, 2016  (JP) .............................. JP2016-052514
Mar. 16, 2016  (JP) .............................. JP2016-052515
(Continued)

(51) Int. Cl.
*B60Q 1/00*     (2006.01)
*B60S 1/08*     (2006.01)
(Continued)

(52) U.S. Cl.
CPC ............... *B60S 1/56* (2013.01); *B60S 1/0848* (2013.01); *G02B 27/0006* (2013.01); *G03B 17/08* (2013.01); *B60Q 1/0023* (2013.01)

(58) Field of Classification Search
CPC ........ B60Q 1/0023; B60S 1/0848; B60S 1/56; G02B 27/0006; G03B 17/08
(Continued)

(56) References Cited

U.S. PATENT DOCUMENTS

2008/0112050 A1   5/2008   Nomura
2009/0250533 A1   10/2009  Akiyama et al.
(Continued)

FOREIGN PATENT DOCUMENTS

CN   201513606 U   6/2010
CN   202165655 U   3/2012
(Continued)

OTHER PUBLICATIONS

Communication dated Aug. 20, 2019, issued by the European Patent Office in counterpart European Application No. 19174240.2.
(Continued)

*Primary Examiner* — Levon J Shahinian
(74) *Attorney, Agent, or Firm* — Sughrue Mion, PLLC

(57) ABSTRACT

A camera module shoots a satisfactory image by suppressing the adherence of water droplets to a part in a light transmitting cover through which imaging light is transmitted. Provided are an outer casing comprising a housing having an opening and a light transmitting cover for closing the opening; and a camera module arranged inside the outer casing. A part of the light transmitting cover is provided as a transmission window through which imaging light incident on the camera module is transmitted and a restriction
(Continued)

part for restricting the inflow of water droplets toward the transmission window is provided to the light transmitting cover.

5 Claims, 29 Drawing Sheets

(30) Foreign Application Priority Data

Mar. 16, 2016 (JP) .............. JP2016-052516
Mar. 16, 2016 (JP) .............. JP2016-052517

(51) Int. Cl.
*B60S 1/56* (2006.01)
*G02B 27/00* (2006.01)
*G03B 17/08* (2021.01)

(58) Field of Classification Search
USPC ...... 15/250.01, 250.02; 134/56 R, 95.3, 198; 239/284.1; 359/507
See application file for complete search history.

(56) References Cited

U.S. PATENT DOCUMENTS

| | | |
|---|---|---|
| 2011/0073142 A1 | 3/2011 | Hattori et al. |
| 2011/0193960 A1 | 8/2011 | Endo et al. |
| 2011/0266375 A1 | 11/2011 | Ono et al. |
| 2011/0292212 A1 | 12/2011 | Tanabe et al. |
| 2012/0117745 A1 | 5/2012 | Hattori et al. |
| 2013/0255023 A1 | 10/2013 | Kikuta et al. |
| 2014/0367488 A1 | 12/2014 | Dominique et al. |
| 2015/0353024 A1 | 12/2015 | Cooper |
| 2016/0325715 A1 | 11/2016 | Niemczyk |

FOREIGN PATENT DOCUMENTS

| | | |
|---|---|---|
| DE | 202006002671 U1 | 5/2006 |
| DE | 102012221074 A1 | 5/2014 |
| DE | 102014202072 A1 | 7/2015 |
| EP | 2878999 A1 | 6/2015 |
| JP | 55-114641 A | 9/1980 |
| JP | H11-198724 A | 7/1999 |
| JP | 2001-111874 A | 4/2001 |
| JP | 2002-87219 A | 3/2002 |
| JP | 2004-50079 A | 2/2004 |
| JP | 2006-313312 A | 11/2006 |
| JP | 2007-83841 A | 4/2007 |
| JP | 2011-184030 A | 9/2011 |
| JP | 2011-244417 A | 12/2011 |
| JP | 2013-134366 A | 7/2013 |
| JP | 2013-208984 A | 10/2013 |
| WO | 02/022410 A1 | 3/2002 |
| WO | 2015/141457 A1 | 9/2015 |
| WO | 2016/008722 A1 | 1/2016 |

OTHER PUBLICATIONS

Communication dated Aug. 20, 2019, issued by the European Patent Office in counterpart European Application No. 19174238.6.
Communication dated Aug. 20, 2019, issued by the European Patent Office in counterpart European Application No. 19174239.4.
Communication dated Oct. 11, 2019, issued by the European Patent Office in counterpart European Application No. 17766695.5.
International Search Report (PCT/ISA/210), issued by International Searching Authority in corresponding International Application No. PCT/JP2017/010262, dated Jun. 13, 2017.
Written Opinion (PCT/ISA/237) issued by the International Searching Authority in corresponding International Application No. PCT/JP2017/010262, dated Jun. 13, 2017.
Office Action dated May 8, 2020 issued by the State Intellectual Property of P.R. China in corresponding Application No. 201780018099.X.

IMAGING DEVICE FOR VEHICLE, LIGHTING DEVICE FOR VEHICLE AND FOREIGN SUBSTANCE REMOVAL SYSTEM FOR VEHICLE

TECHNICAL FIELD

The disclosure relates to a technical field having a camera module for capturing an image.

CITATION LIST

Patent Document

Patent Document 1: Japanese Patent Laid-Open Publication No. 2011-184030

BACKGROUND ART

For example, there is a vehicle imaging device in which a camera module for capturing a predetermined area is disposed inside an outer casing constituted by a translucent cover and a housing (e.g., see Patent Document 1). Further, some vehicle imaging devices also function as vehicle lamps.

Such a vehicle imaging device is utilized in a state of being attached to both left and right side surfaces of a vehicle body, for example. An area from the rear to the side is captured by a camera module, and the captured image is displayed on a screen of a display disposed in a passenger compartment.

A driver can grasp a situation in an area from the rear side to the side by visually recognizing a left side image and a right side image displayed on the screen of the display and can drive according to the grasped situation.

When such a vehicle imaging device is provided, an area from the rear side to the side is captured by a camera module. Therefore, it is possible to produce a vehicle that does not require a side-view mirror.

In the vehicle imaging device disclosed in Patent Document 1, a chassis is disposed inside an outer casing, and a substrate is attached to the chassis. Further, a holder is attached to a rear end portion of the chassis, and a camera module is held in the holder.

DISCLOSURE OF INVENTION

Problems to be Solved by Invention

By the way, in the vehicle imaging device including the camera module as described above, image capturing light is transmitted through a translucent cover and is incident on the camera module. Therefore, the quality of an image captured by the camera module may be deteriorated depending on the state of the portion of the translucent cover, through which the image capturing light is transmitted.

When such deterioration in the image quality occurs, a passenger may not recognize well the situation behind the vehicle when visually confirming the screen of the display disposed in a passenger compartment. Thus, there is a possibility that the safety is deteriorated.

Accordingly, in order to capture a good image by the camera module, it is necessary to suppress the adhesion of water droplets to the portion of the translucent cover, through which image capturing light is transmitted.

Therefore, the disclosure aims to suppress the adhesion of water droplets to the portion of a translucent cover, through which image capturing light is transmitted, and to capture a good image by a camera module.

Means for Solving the Problems

As a first aspect, a vehicle imaging device according to the disclosure includes an outer casing comprising a housing having an opening and a translucent cover closing the opening; and a camera module disposed inside the outer casing. A part of the translucent cover is provided as a transmission window through which image capturing light to be incident on the camera module is transmitted. The translucent cover is provided with a restriction portion configured to restrict the intrusion of water droplets into the transmission window.

In this way, the flow of water droplets to the transmission window is restricted by the restriction portion, and the adhesion of water droplets to the transmission window is suppressed.

As a second aspect, in the above-described vehicle imaging device according to the disclosure, it is preferable that the restriction portion is formed in a protruding shape.

In this way, the water droplets flowing are blocked by the protruding restriction portion.

As a third aspect, in the above-described vehicle imaging device according to the disclosure, it is preferable that the restriction portion is provided around the transmission window.

In this way, the restriction portion is positioned at a position where water droplets are most likely to flow into the transmission window.

As a fourth aspect, in the above-described vehicle imaging device according to the disclosure, it is preferable that an injection port of fluid to be blown onto the transmission window is formed, the restriction portion is formed in a shape having a passage hole of the fluid, and the restriction portion is provided in the vicinity of the injection port In this way, the injection port is surrounded by the restriction portion, so that the intrusion of foreign substances such as water droplets or dust from the injection port is suppressed by the restriction portion.

As a fifth aspect, in the above-described vehicle imaging device according to the disclosure, it is preferable that an injection port of fluid to be blown onto the transmission window is formed in the housing, and the restriction portion is provided on the side opposite to the injection port with the transmission window interposed therebetween in a injection direction of the fluid.

In this way, the path of fluid injected from the injection port is changed by the restriction portion, and the fluid is blown over a wide range of the transmission window.

As a sixth aspect, in the above-described vehicle imaging device according to the disclosure, it is preferable that the restriction portion has a first wall portion located on the side opposite to the injection port with the transmission window interposed therebetween in the injection direction of the fluid, and a second wall portion located at least one of above and below the transmission window.

In this way, the path of fluid injected from the injection port is changed to a spiral path by the restriction portion, and the fluid is blown over a wider range of the transmission window.

As a seventh aspect, a vehicle lamp according to the disclosure includes an outer casing comprising a housing having an opening and a translucent cover closing the opening; a camera module disposed inside the outer casing; and a light emitting element provided as a light source and disposed inside the outer casing. A part of the translucent cover is provided as a transmission window through which image capturing light to be incident on the camera module is transmitted. The translucent cover is provided with a restriction portion configured to restrict the intrusion of water droplets into the transmission window.

In this way, the flow of water droplets to the transmission window is restricted by the restriction portion, and the adhesion of water droplets to the transmission window is suppressed.

Effects of Invention

According to the disclosure, the flow of water droplets to the transmission window is restricted by the restriction portion and the adhesion of water droplets to the transmission window is suppressed. Therefore, it is possible to suppress the adhesion of water droplets to the portion of the translucent cover, through which image capturing light is transmitted, and to capture a good image by the camera module.

BRIEF DESCRIPTION OF DRAWINGS

FIG. 34 is a sectional view of the vehicle lamp showing a state in which the flow path is blocked;

FIG. 36 is a perspective view showing a state in which the flow path is blocked by the rotary valve and showing a part thereof in section;

EMBODIMENT FOR CARRYING OUT INVENTION

Hereinafter, an embodiment for carrying out the disclosure will be described with reference to the accompanying drawings.

In an embodiment described below, a vehicle lamp according to the disclosure is applied to a side turn signal lamp. Here, the scope of application of the vehicle lamp according to the disclosure is not limited to the side turn signal lamp. The vehicle lamp of the disclosure can be widely applied to various vehicle lamps such as a headlamp, a clearance lamp, a tail lamp, a turn signal lamp, a stop lamp, a daytime running lamp, a cornering lamp, a hazard lamp, a position lamp, a back lamp, a fog lamp, a high mount stop lamp, a foot lamp, etc., or a combination lamp as a combination thereof, so long as a camera module can be arranged therein.

In addition, the disclosure may be applied to a vehicle imaging device. In this case, the disclosure includes a camera module, but may be configured without a light source.

Figure 1:
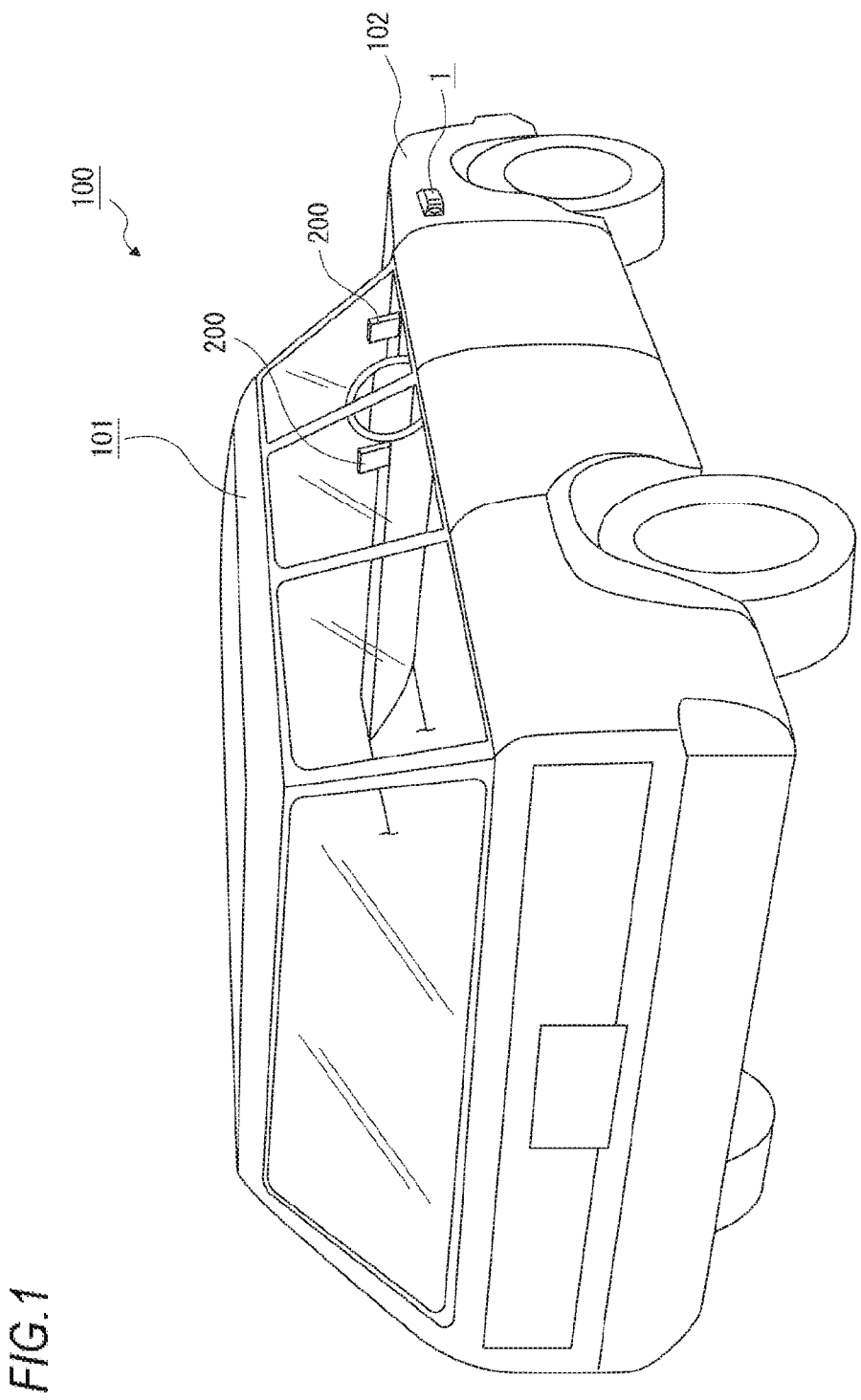
FIG. 1 is a perspective view of a vehicle, showing an embodiment of the disclosure together with FIGS. 2 to 50.

Vehicle lamps 1, 1 are mounted on left and right side surfaces 102, 102 of a vehicle body 101 of a vehicle 100, respectively (see FIG. 1).

Each vehicle lamp 1 also functions as a vehicle imaging device and is capable of capturing, for example, an area from the rear side to the side of the vehicle 100 by a camera module (to be described later). An image (picture) captured by the camera module is displayed on each screen of displays 200, 200 arranged in a passenger compartment. A left side image and a right side image are displayed on the respective screens of the displays 200, 200, respectively. In addition, a single display 200 may be provided in a passenger compartment, and two screens on which the left side image and the right side image are respectively displayed may be provided on the display 200.

A driver can grasp a situation in an area from the rear side to the side by visually recognizing the left side image and the right side image displayed on the respective screens of the displays 200, 200 and can drive according to the grasped situation.

Since the vehicle lamps 1, 1 can capture the area from the rear side to the side of the vehicle 100 as described above, the vehicle 100 is not provided with a side-view mirror and is made smaller.

Each vehicle lamp 1 includes a housing 2 and a translucent cover 3 (see FIGS. 2 to 5). Here, the vehicle lamp 1 attached to a right side surface 102 of the vehicle 100 will be described below as an example. The vehicle lamp 1 attached to a left side surface 102 of the vehicle 100 is formed in a bilateral symmetrical shape with respect to the vehicle lamp 1 attached to the right side surface 102 of the vehicle 100.

An outer casing 4 is configured by the housing 2 and the translucent cover 3, and an internal space of the outer casing 4 is formed as a lamp chamber 5.

The housing 2 is formed of, for example, a resin material. The housing 2 has a casing portion 6 opened to the side, a cover mounting portion 7 provided continuously to an opening edge of the casing portion 6, and a protruding portion 8 protruding sideways from the casing portion 6, which are integrally formed.

The casing portion 6 has an upper surface portion 9 oriented in an upper and lower direction, a lower surface portion 10 oriented in the upper and lower direction, a front surface portion 11 oriented substantially in a front and rear direction, a rear surface portion 12 oriented in the front and rear direction, and a bottom surface portion 13 oriented in a left and right direction. One side edge of each of the upper surface portion 9, the lower surface portion 10, the front surface portion 11 and the rear surface portion 12 is continuous with a peripheral edge of the bottom surface portion 13.

A placement opening 11*a* penetrating in the front and rear direction is formed in the front surface portion 11. Positioning protrusions 14, 14 respectively protruding rearward from both upper and lower end portions on the inner surface of the front surface portion 11 are provided.

The cover mounting portion 7 has a substantially flat plate-like base portion 15 oriented in the left and right direction and overhang portions 16, 16 projecting upward or downward from respective side edges of the upper surface portion 9 and the lower surface portion 10. A screw insertion hole 15*a* is formed substantially at a central portion of the base portion 15. Front ends of the overhang portions 16, 16 are continuous to a rear end of the outer peripheral portion of the base portion 15, respectively. A positioning rib 17 protruding to the side is provided at a position ranging from the overhang portions 16, 16 to the outer peripheral portion of the base portion 15. The positioning rib 17 is formed in a concave shape opened rearward as a whole.

The protruding portion 8 protrudes laterally (outward) from the front surface portion 11.

A nozzle 18 is formed, for example, integrally with the rear surface portion 12 of the housing 2. The nozzle 18 has a function of discharging fluid toward a predetermined portion of the translucent cover 3. The nozzle 18 has an injection portion 19 and a connection cylinder portion 20 continuous to the injection portion 19. An internal space of the nozzle 18 is formed as a flowing space 18a through which fluid flows.

One end face on the side of the injection portion 19 is flush with one end face on the side of the rear surface portion 12. An opening of the injection portion 19 is formed as an injection port 19a which has a longitudinally elongated shape.

The connection cylinder portion 20 is positioned on the rear side of the rear surface portion 12 so as to be separated from the rear surface portion 12. An annular engaging protrusion 20a protruding outward is provided on the connection cylinder portion 20.

As described above, the housing 2 and the nozzle 18 are integrally formed, so that fluid is injected from the nozzle 18 integrally provided in the housing 2. In this way, it is possible to simplify the structure of the vehicle lamp 1 and to reduce the manufacturing cost of the vehicle lamp 1 by reducing the number of parts.

The translucent cover 3 is formed of a transparent material such as resin or glass. The translucent cover 3 has a bowl shape opened laterally (to the left) as a whole, and the length in the front and rear direction thereof is longer than the length in the upper and lower direction and in the left and right direction. The translucent cover 3 has a curved surface portion 21 located at the center portion in the upper and lower direction, an emission surface portion 22 continuous to a rear end of the curved surface portion 21, a flat surface portion 23 continuous to a rear end of the emission surface portion 22, an upper surface portion 24 continuous to respective upper edges of the curved surface portion 21, the emission surface portion 22 and the flat surface portion 23, and a lower surface portion 25 continuous to respective lower edges of the curved surface portion 21, the emission surface portion 22 and the flat surface portion 23.

The curved surface portion 21 is formed in a curved surface shape convex to the outside of the vehicle and a front half thereof has greater curvature than a rear half.

The emission surface portion 22 is inclined in a direction approaching the side surface 102 of the vehicle body 101 toward the rear side. Optical steps 22a, 22a, . . . are formed on the inner surface of the emission surface portion 22. The optical steps 22a. 22a, . . . have a function of controlling light emitted from a light emitting element (light source) described below. Light emitted from the light emitting element, transmitted through the emission surface portion 22 and directed to the outside is controlled by the optical steps 22a, 22a, . . . and irradiated to a predetermined region.

A transmission window 23a in which no step is formed is provided in the flat surface portion 23. The transmission window 23a is formed, for example, in an oval shape which is elongated in the upper and lower direction. The transmission window 23a is located at a region which does not obstruct the angle of view of a camera module described below.

A light shielding portion 26 is formed at a position covering the outer periphery of the transmission window 23a in the flat surface portion 23. The light shielding portion 26 is formed, for example, in a black band shape and is buried in the flat surface portion 23.

Figure 6:
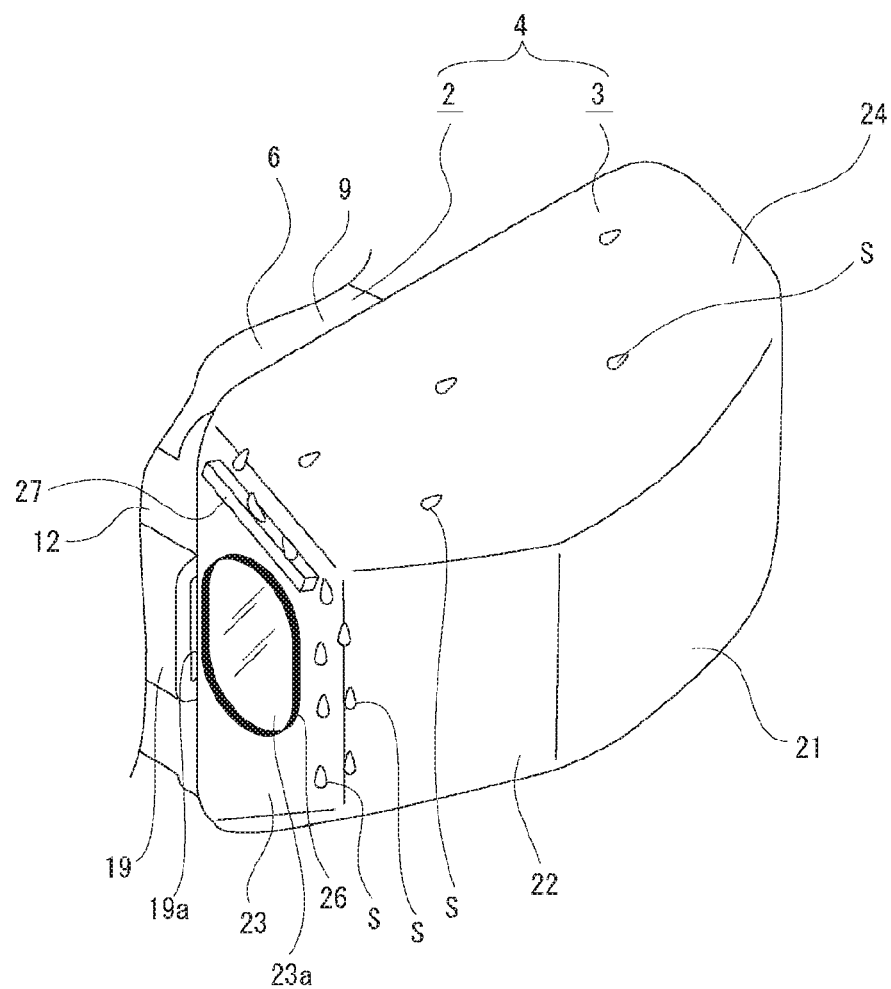
FIG. 6 is a perspective view showing a state in which water droplets are restricted from flowing into a transmission window by a restriction portion.

The translucent cover 3 may be provided with, for example, a restriction portion 27 protruding rearward (see FIG. 6). The restriction portion 27 is provided, for example, at an upper end portion of the flat surface portion 23 above the transmission window 23a. The restriction portion 27 is formed in a shape extending in the left and right direction or in a shape which is inclined so as to be displaced downward toward the outer side in the left and right direction. The restriction portion 27 has a function of suppressing the inflow of water droplets into the transmission window 23a in rainy day or the like.

The restriction portion 27 is provided, for example, integrally with the flat surface portion 23. Since the restriction portion 27 is provided integrally with the flat surface portion 23, it is possible to easily manufacture the translucent cover 3 and to reduce the manufacturing cost by reducing the number of parts.

Figure 2:
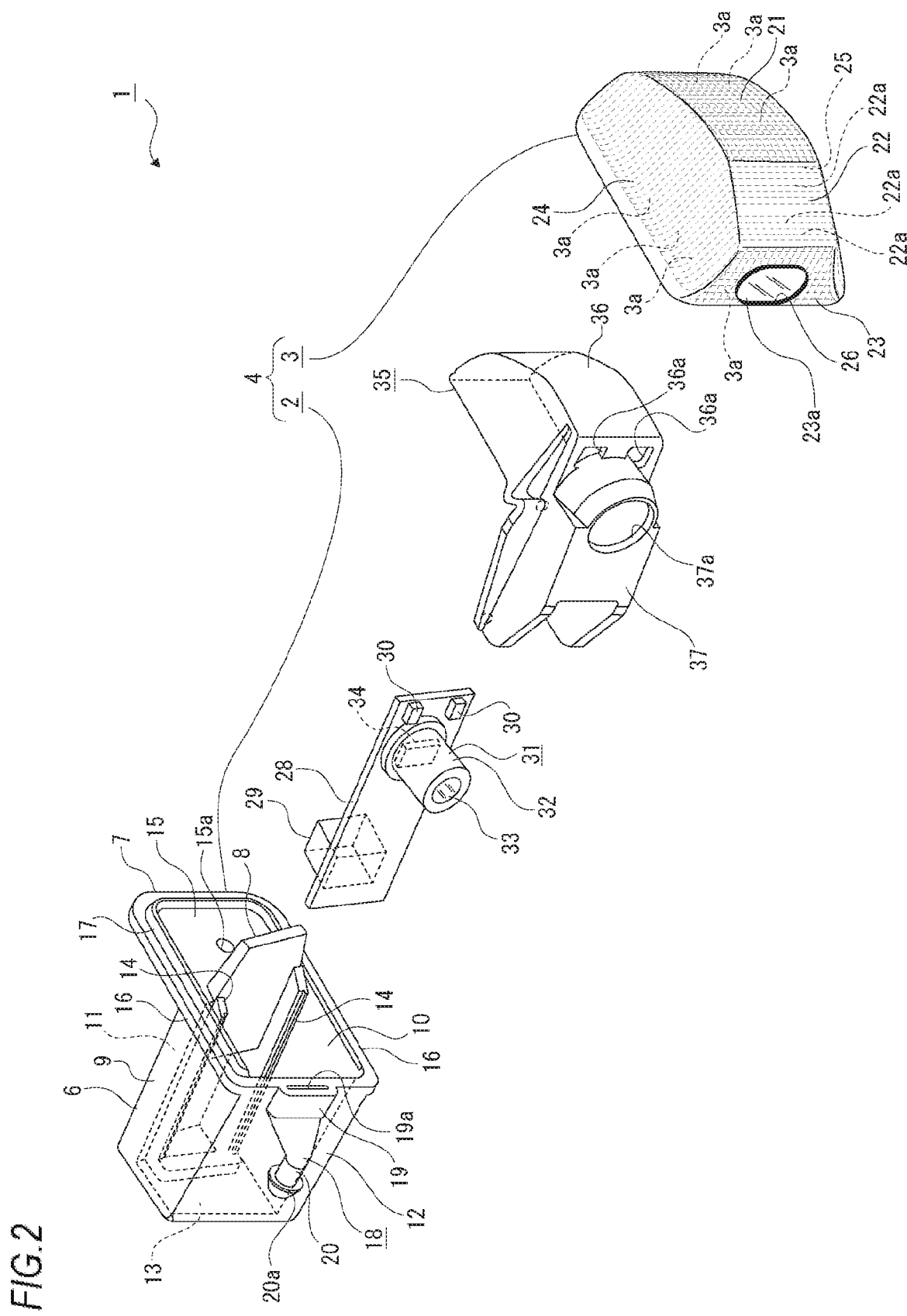
FIG. 2 is an exploded perspective view of a vehicle lamp.
Figure 5:
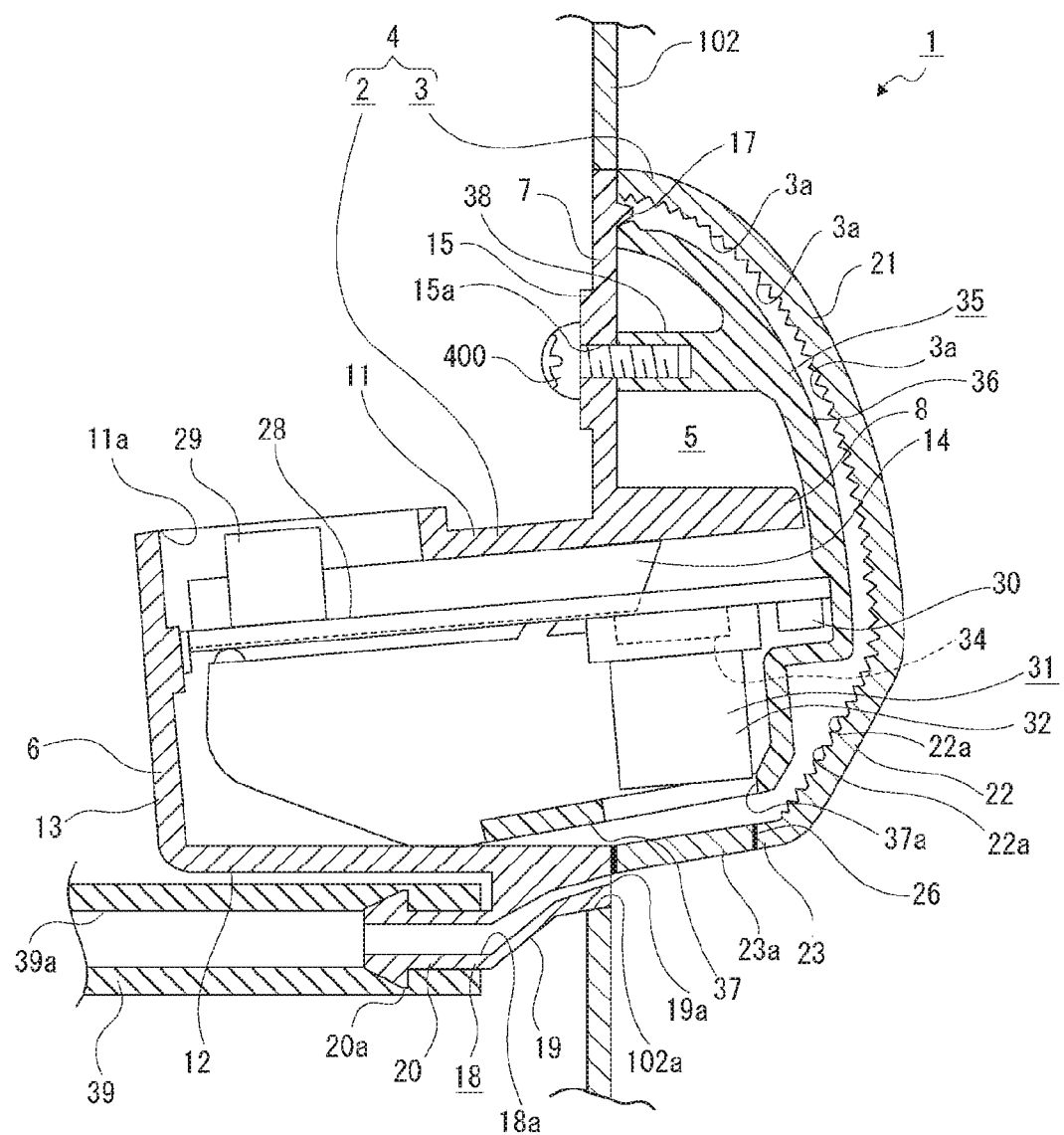
FIG. 5 is a sectional view taken along the line V-V in FIG. 3, showing the vehicle lamp in a state of being attached to a vehicle body.

On the inner surface of the translucent cover 3, steps 3a, 3a, . . . having a predetermined shape are formed in portions other than the emission surface portion 22 and the transmission window 23a (see FIGS. 2 and 5). The steps 3a, 3a, . . . have a function of diffusing light. Light incident on the translucent cover 3 from the outside is diffused by the steps 3a, 3a, . . . , and thus, the structure disposed inside the outer casing 4 is made difficult to visually recognize. High pressure air (to be described later) injected from the injection portion 19 is blown onto the surface of the transmission window 23a, and foreign substances such as water droplets and dust adhering to the transmission window 23a are removed.

As shown in FIG. 5, the translucent cover 3 is brought into contact with the cover mounting portion 7 of the housing 2 so as to be externally fitted to the positioning rib 17. The translucent cover 3 is attached to the cover mounting portion 7 by adhesion or laser welding or the like in a state of being positioned by the positioning rib 17.

Figure 3:
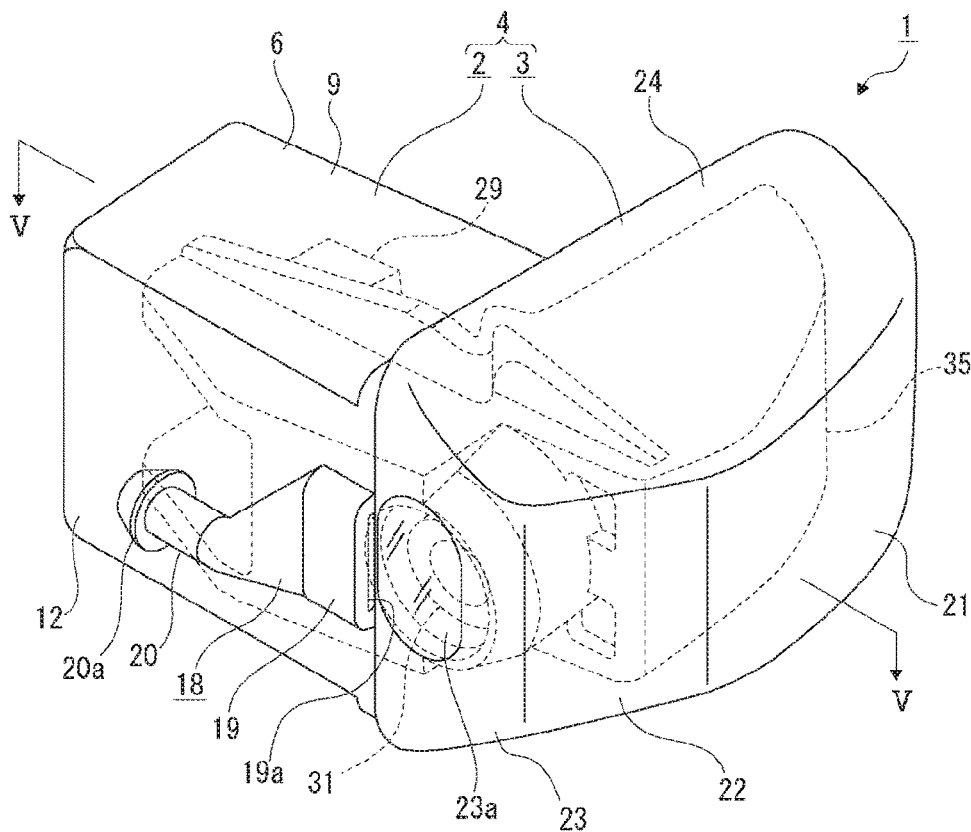
FIG. 3 is a perspective view of the vehicle lamp in which an internal structure is indicated by a broken line.
Figure 4:
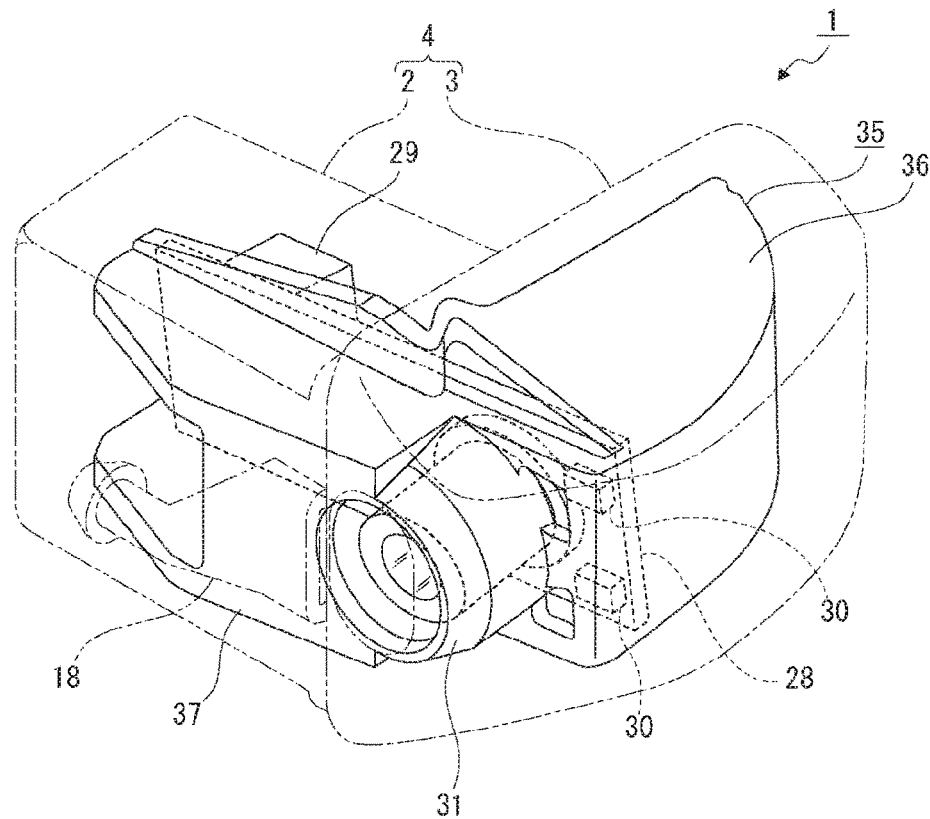
FIG. 4 is a perspective view of the vehicle lamp in which a part of the internal structure is indicated by a solid line.

In a state where the translucent cover 3 is attached to the cover mounting portion 7, the injection port 19a formed in the injection portion 19 of the nozzle 18 is positioned in the vicinity of the transmission window 23a (see FIGS. 3 and 5).

A substrate 28 is disposed inside the outer casing 4 (see FIGS. 2, 3 and 5). The substrate 28 has a substantially rectangular shape oriented in the front and rear direction and elongated in the left and right direction. A connector 29 is arranged at one end portion in the longitudinal direction on the front surface of the substrate 28. The connector 29 has a function of inputting a power supply or outputting a signal of an image (picture) captured by a camera module described below. A connection terminal (not shown) on the side of the vehicle 100 is connected to the connector 29.

Light emitting elements 30, 30 serving as a light source are arranged on the rear surface of the substrate 28 so as to be spaced apart from each other in the upper and lower direction. The light emitting elements 30, 30 are arranged at the end opposite to the end on the side where the connector 29 is disposed in the longitudinal direction of the substrate 28. As the light emitting elements 30, 30, for example, a light emitting diode (LED) is used.

A camera module 31 is attached to the rear surface of the substrate 28. The camera module 31 is positioned close to the end on the side where the light emitting elements 30, 30 are arranged in the longitudinal direction of the substrate 28. The camera module 31 is projected rearward from the substrate 28. The camera module 31 includes a substantially cylindrical lens barrel 32, one or more lenses 33 held by the lens barrel 32, and an image capturing device 34 disposed on the substrate 28.

The substrate 28 on which the connector 29, the light emitting elements 30, 30 and the camera module 31 or the like are disposed as described above is placed in the housing 2 by being inserted into the casing portion 6 of the housing 2 from the end side where the connector 29 is disposed (see FIG. 5).

In a state where the substrate 28 is inserted into the casing portion 6, a tip end portion of the connector 29 is positioned in a placement opening 11a formed in the front surface portion 11, the camera module 31 is positioned laterally (outward) from the rear surface portion 12, and the lens 33 located at the rearmost side in a state where the translucent cover 3 is attached to the housing 2 is positioned so as to face the transmission window 23a of the translucent cover 3.

In a state where the vehicle lamp 1 is attached to the vehicle body 101, an optical axis of the camera module 31 is slightly inclined obliquely downward with respect to a horizontal direction and slightly inclined to the outside of the vehicle with respect to the front and rear direction.

A pressing member 35 is disposed inside the outer casing 4, and the substrate 28 is pressed by the pressing member 35. Respective parts of the pressing member 35 are integrally formed by a resin material. The pressing member 35 has a pressing portion 36, a functional portion 37, and a shaft portion 38 to be attached (see FIGS. 2 and 5).

The pressing portion 36 is formed in a casing shape opened to the side (to the left) as a whole. Light transmitting holes 36a, 36a penetrating in the front and rear direction are respectively formed on the rear surface portion of the pressing portion 36 so as to be spaced apart from each other. Light emitted from the light emitting elements 30, 30 is transmitted through the light transmitting holes 36a, 36a, respectively.

The functional portion 37 is formed in a casing shape opened to the front as a whole. A right end portion of the functional portion 37 is continuous to a rear end portion of the pressing portion 36. A circular imaging hole 37a penetrating in the front and rear direction is formed in the functional portion 37.

The shaft portion 38 to be attached protrudes to the left from the side surface portion of the pressing portion 36 and is formed in a cylindrical shape.

The pressing member 35 excluding a part is disposed inside the outer casing 4 in a state of being inserted into the casing portion 6 of the housing 2 (see FIG. 5). The pressing member 35 is attached to the housing 2 by screwing a mounting screw 400 inserted into the screw insertion hole 15a formed in the base portion 15 to the shaft portion 38 to be attached.

In a state where the pressing member 35 is attached to the housing 2, the substrate 28 is pressed from the side by the pressing portion 36, a rear end portion of the functional portion 37 is brought into contact with the inner surface of the rear surface portion 12 of the housing 2, and the substrate 28 is pressed against the positioning protrusion 14 by a front end portion of the functional portion 37, so that the substrate 28 is positioned with respect to the housing 2.

In a state where the substrate 28 is positioned with respect to the housing 2 by the pressing member 35, the light emitting elements 30, 30 are respectively positioned right in front of the light transmitting holes 36a, 36a of the pressing member 35, and the light emitting elements 30, 30, the light transmitting holes 36a. 36a, and the emission surface portion 22 of the translucent cover 3 are positioned side by side in order in the front and rear direction.

Further, in a state where the substrate 28 is positioned with respect to the housing 2 by the pressing member 35, the camera module 31 is positioned right in front of the imaging hole 37a of the pressing member 35, and the camera module 31, the imaging hole 37a, and the transmission window 23a of the translucent cover 3 are positioned side by side in order in the front and rear direction.

One end of a hose 39 made of rubber or resin or the like is connected to the connection cylinder portion 20 provided in the housing 2. Since the hose 39 is brought into close contact with the engaging protrusion 20a and engaged therewith, the hose 39 is prevented from coming off from the nozzle 18. The other end of the hose 39 is connected to a fluid supply source described below.

The vehicle lamp 1 configured as described above is attached to the vehicle body 101 in a state where the casing portion 6 of the housing 2 excluding a part is inserted into an insertion hole 102a formed in the side surface 102.

In the vehicle lamp 1, when light is emitted from the light emitting elements 30, 30, the emitted light is incident on the emission surface portion 22 of the translucent cover 3 through the light transmitting holes 36a, 36a of the pressing member 35. The incident light is controlled by the optical steps 22a. 22a, . . . of the emission surface portion 22 and irradiated toward the range from the rear side to the side.

On the other hand, when the camera module 31 is operated in the vehicle lamp 1, the image capturing by the camera module 31 is performed. The image capturing is performed by the camera module 31 of the vehicle lamp 1 disposed on the left side surface 102 of the vehicle 100 and the camera module 31 of the vehicle lamp 1 disposed on the right side surface 102 of the vehicle 100, respectively. The images (pictures) captured by the camera modules 31, 31 are displayed as a left side image and a right side image on the screens of the displays 200, 200 disposed in the passenger compartment, respectively.

Figure 7:
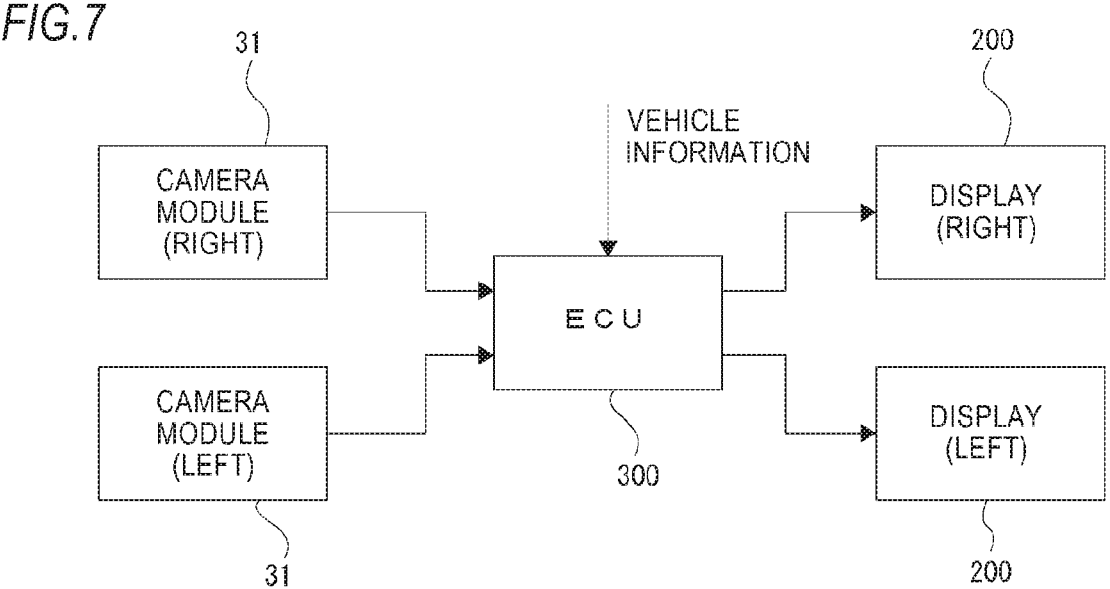
FIG. 7 is a block diagram showing a relationship between a camera module, an ECU and a display.
Figure 8:
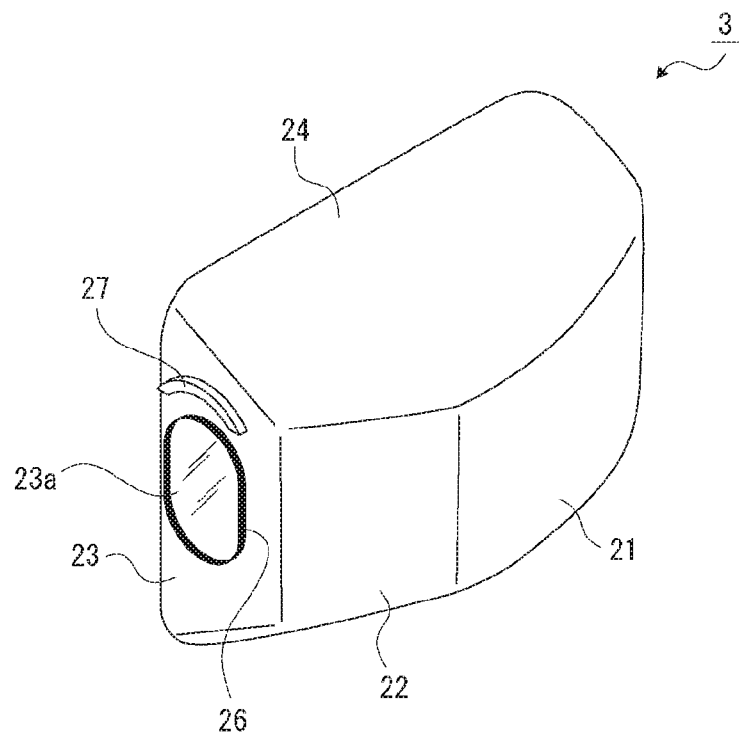
FIG. 8 is a perspective view of a translucent cover showing an example of the restriction portion formed in an arcuate shape.

When the image capturing is performed by each of the right camera module 31 and the left camera module 31, image capturing light is photo-electrically converted by each of the image capturing devices 34, 34, and an image capturing signal is sent to an ECU (electronic control unit) 300 (see FIG. 7). The ECU 300 sends an image signal based on the input image capturing signal to each of the displays 200, 200, and the left side image and the right side image are displayed on the screen of each of the right display 200 and the right display 200, respectively.

Information (vehicle information) relating to the vehicle 100 is also input to the ECU 300. Each control such as engine control, automatic control, driving control, and braking control is also performed in accordance with command signals sent from the ECU 300 to each part based on respective information.

A driver can grasp a situation in an area from the rear side to the side by visually recognizing the left side image and the right side image displayed on the screens of the displays 200, 200 and can drive according to the grasped situation.

When a vehicle travels in rainy weather, water droplets S, S, . . . (raindrops) are adhered to the vehicle lamp 1. The water droplets S, S, . . . are flowing from the front to the rear on the surface of the translucent cover 3 when the vehicle travels forward (see FIG. 6). In particular, the water droplets S, S, . . . are liable to flow toward the rear on the upper surface portion 24 of the translucent cover 3. However, the water droplets S, S, . . . are blocked by the restriction portion 27 provided in the translucent cover 3, and the flowing thereof is restricted. Since the restriction portion 27 is positioned above the transmission window 23a, the water droplets S, S, . . . , the flowing of which is restricted by the restriction portion 27, are caused to flow to the outside of the transmission window 23a along the restriction portion 27 and are dropped.

Therefore, the flowing of the water droplets to the transmission window 23a is restricted by the restriction portion 27, and the attachment of the water droplets to the transmission window 23a is suppressed. In this way, a good incident state of image capturing light from the transmission window 23a to the camera module 31 is secured, and the attachment of the water droplets to the portion of the translucent cover 3 through which the image capturing light is transmitted is suppressed, so that a good image can be captured by the camera module 31.

Further, since the restriction portion 27 is formed in a protruding shape, the water droplets flowing are blocked by the restriction portion 27 having the protruding shape. In this way, it is possible to more effectively restrict the inflow of the water droplets into the transmission window 23a.

Furthermore, since the restriction portion 27 is provided above the transmission window 23a, the restriction portion 27 is positioned at a position where the water droplets are most likely to flow into the transmission window 23a. In this way, it is possible to more effectively restrict the inflow of the water droplets into the transmission window 23a.

Hereinafter, modifications on the shape and forming position or the like of the restriction portion 27 will be described (see FIG. 8 to 24).

Figure 9:
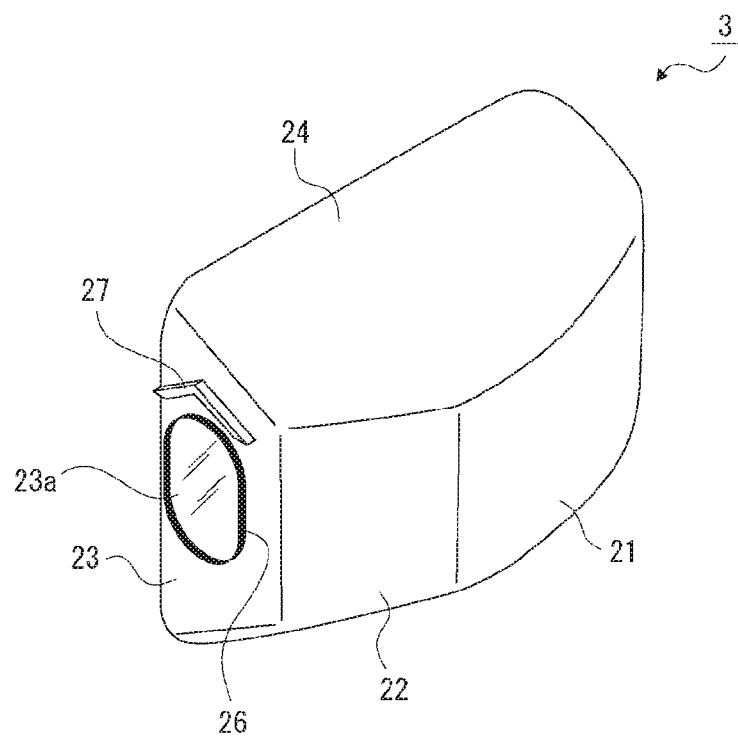
FIG. 9 is a perspective view of the translucent cover showing an example of the restriction portion formed in an inverted U shape.
Figure 10:
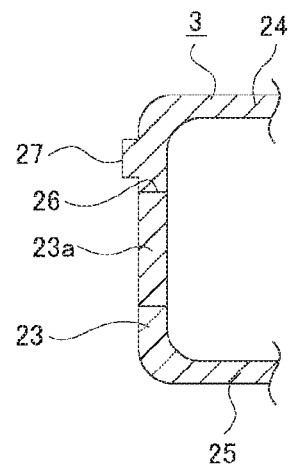
FIG. 10 is a perspective view of the translucent cover showing an example of the restriction portion having a rectangular sectional shape.
Figure 11:
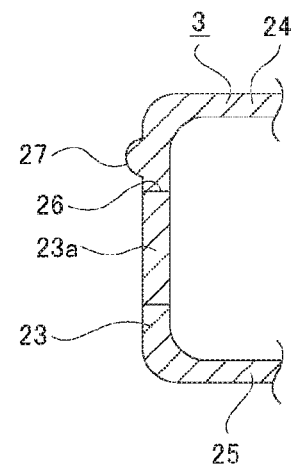
FIG. 11 is a perspective view of the translucent cover showing an example of the restriction portion having a semi-circular sectional shape.

The restriction portion 27 may be formed in various shapes such as an upwardly convex arc shape (see FIG. 8) or an upwardly convex inverted U shape (see FIG. 9). When the restriction portion 27 is formed in such shapes and positioned above the transmission window 23a, it is possible to more effectively restrict the inflow of the water droplets into the transmission window 23a.

Figure 12:
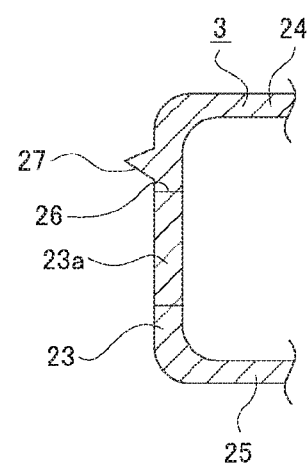
FIG. 12 is a perspective view of the translucent cover showing an example of the restriction portion having a triangular sectional shape.

Further, the restriction portion 27 may be formed in various shapes such as a rectangular sectional shape (see FIG. 10), a semi-circular sectional shape (see FIG. 11) or a triangular sectional shape (see FIG. 12).

Figure 13:
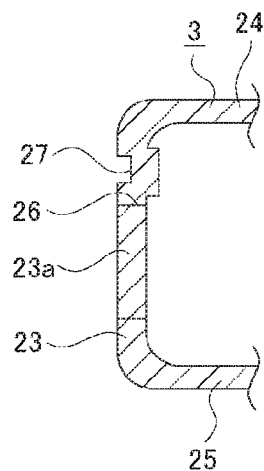
FIG. 13 is a sectional view of the translucent cover showing an example of the restriction portion formed in a groove shape.
Figure 14:
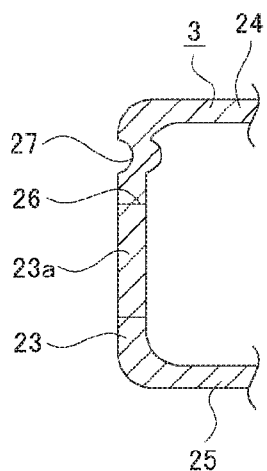
FIG. 14 is a sectional view of the translucent cover showing an example of the restriction portion formed in another groove shape.

Furthermore, the restriction portion 27 may be formed in a groove shape (concave shape) (see FIGS. 13 and 14). The shape of the groove may be an arbitrary shape such as a rectangular shape, a semi-circular shape or a triangular shape. When the restriction portion 27 is formed in a groove shape, the water droplets enter the groove and flows along the restriction portion 27.

Figure 15:
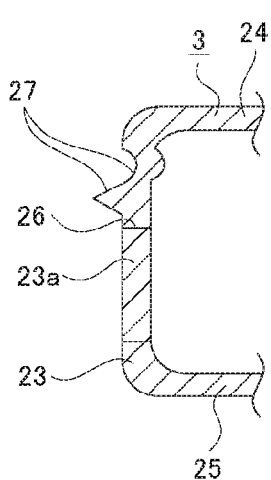
FIG. 15 is a sectional view of the translucent cover showing an example of the restriction portion in which a protruding portion and a groove-like portion are continuously formed.
Figure 16:
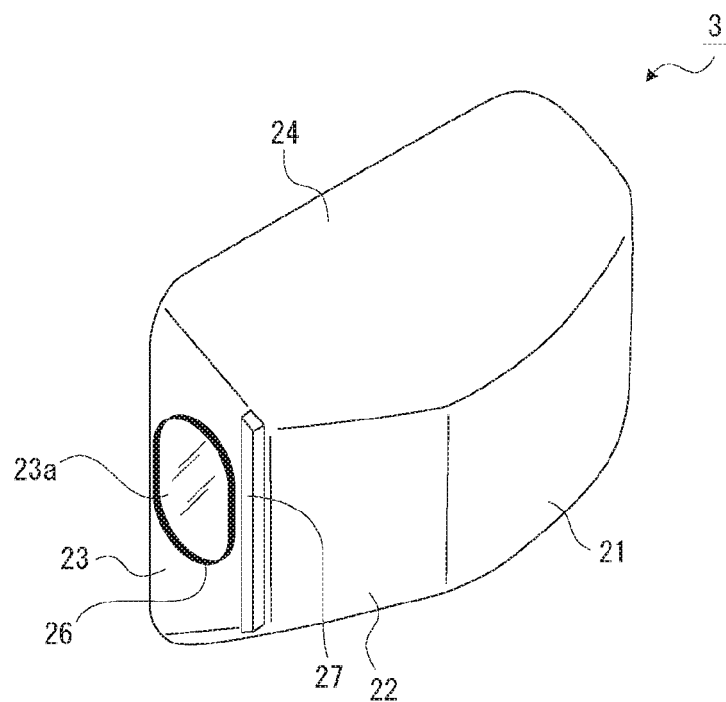
FIG. 16 is a perspective view of the translucent cover showing an example of the restriction portion provided at a side end portion of a flat surface portion.

Moreover, the restriction portion 27 may be formed in such a manner that a protruding portion and a groove-like portion are continuously provided (see FIG. 15). In this case, either of the protruding portion and the groove-like portion may be positioned on the side of the transmission window 23a.

Figure 17:
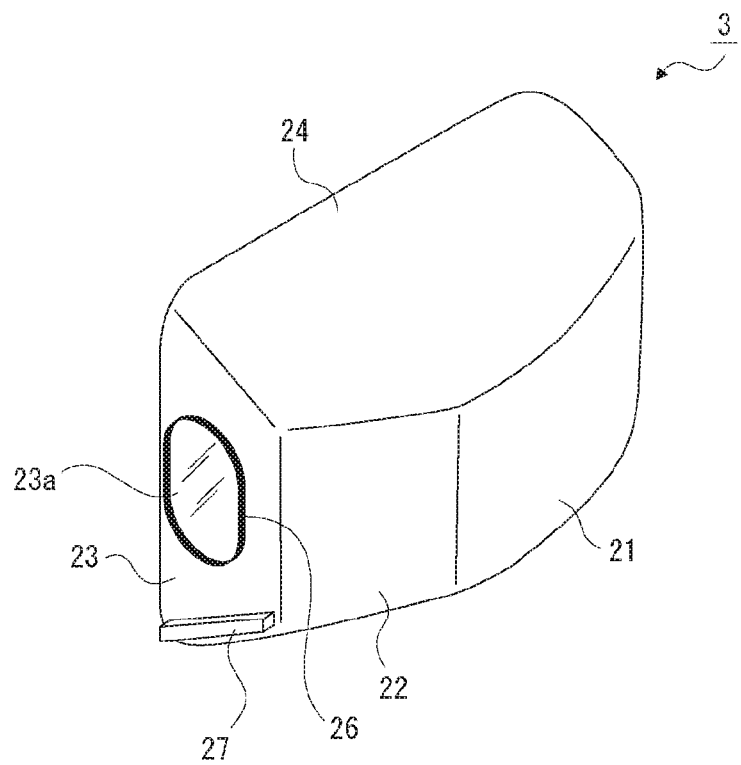
FIG. 17 is a perspective view of the translucent cover showing an example of the restriction portion provided at a lower end portion of the flat surface portion.
Figure 18:
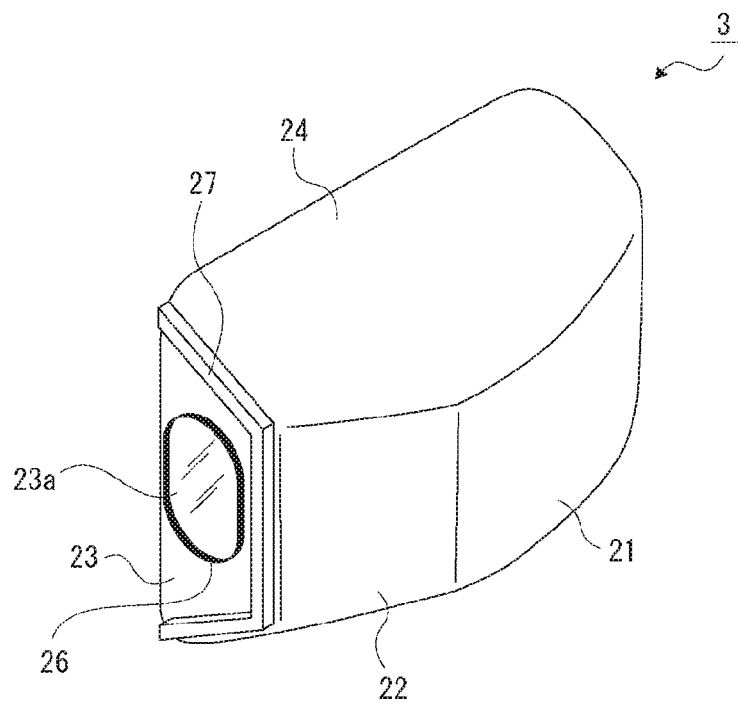
FIG. 18 is a perspective view of the translucent cover showing an example of the restriction portion provided at a position surrounding the transmission window from three sides on an outer peripheral portion of the flat surface portion.

Further, the restriction portion 27 may be provided at an end portion (right end portion) on the side of the flat surface portion 23 in order to restrict the flowing of water droplets from the side to the transmission window 23a (see FIG. 16), or may be provided at a lower end portion of the flat surface portion 23 in order to restrict the flowing of water droplets from the lower side to the transmission window 23a (see FIG. 17).

Figure 19:
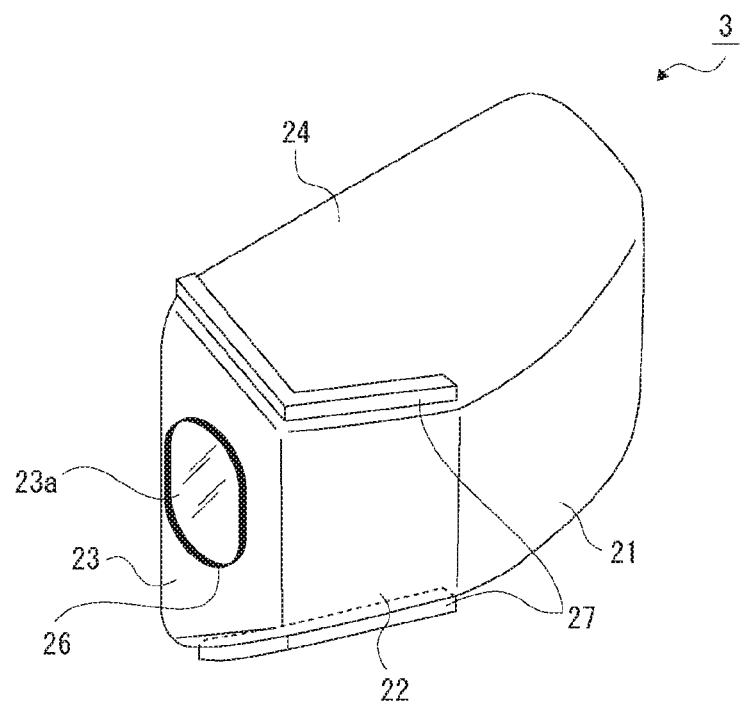
FIG. 19 is a perspective view of the translucent cover showing an example of the restriction portion provided at an upper surface portion and a lower surface portion.

Furthermore, the restriction portion 27 may be provided at a position surrounding the transmission window 23a from three sides on the outer peripheral portion of the flat surface portion 23 (see FIG. 18), or may be provided at the upper surface portion 24 and the lower surface portion 25 in the vicinities of the upper and lower end portions of the flat surface portion 23 and the emission surface portion 22 (see FIG. 19).

Figure 20:
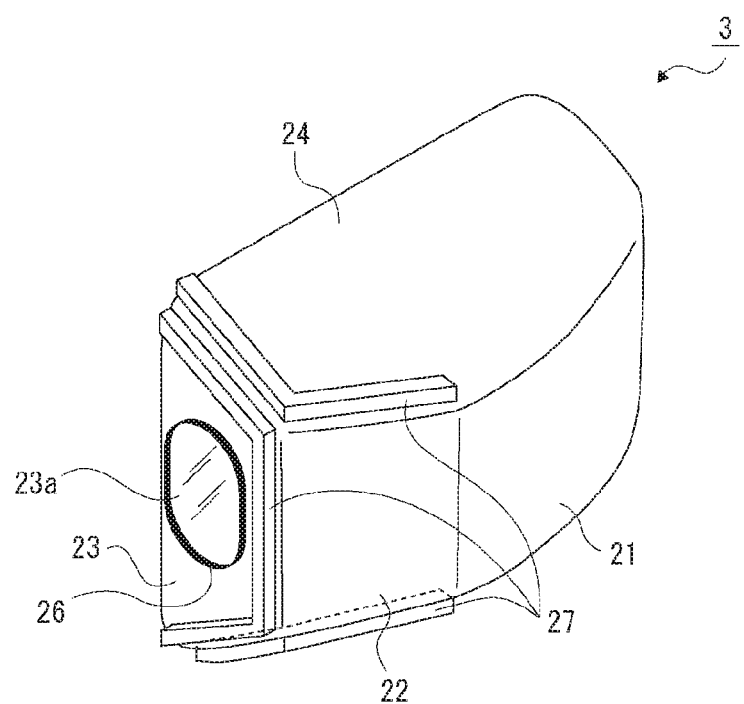
FIG. 20 is a perspective view of the translucent cover showing an example of the restriction portion provided at the upper surface portion and the lower surface portion and at the position surrounding the transmission window from three sides on the outer peripheral portion of the flat surface portion.

Further, the restriction portion 27 may be provided as a double structure at a position surrounding the transmission window 23a from three sides on the outer peripheral portion of the flat surface portion 23 and at the upper surface portion 24 and the lower surface portion 25 in the vicinities of the upper and lower end portions of the flat surface portion 23 and the emission surface portion 22 (see FIG. 20).

In these cases, since the flowing of water droplets to the transmission window 23a is also performed at a position other than the upper side of the transmission window 23a, it is possible to more effectively restrict the inflow of the water droplets into the transmission window 23a.

In addition, although it is more preferable that the restriction portion 27 is provided in the flat surface portion 23 in order to restrict the flowing of water droplets to the transmission window 23a, the restriction portion 27 may be provided in the curved surface portion 21, the upper surface portion 24 or the lower surface portion 25 of the translucent cover 3. Further, the restriction portion 27 may be provided in the emission surface portion 22. However, when the restriction portion 27 is provided in the emission surface portion 22, it is necessary to prevent light emitted from the light emitting elements 30, 30 and transmitted through the emission surface portion 22 from being hindered by the restriction portion 27.

As described above, in the vehicle lamp 1, the flowing of water droplets to the transmission window 23a is restricted by the restriction portion 27. However, fluid for blowing away foreign substances such as water droplets or dust that may be adhered to the transmission window 23a, for example, high pressure air is blown from the nozzle 18 to the transmission window 23a.

Figure 21:
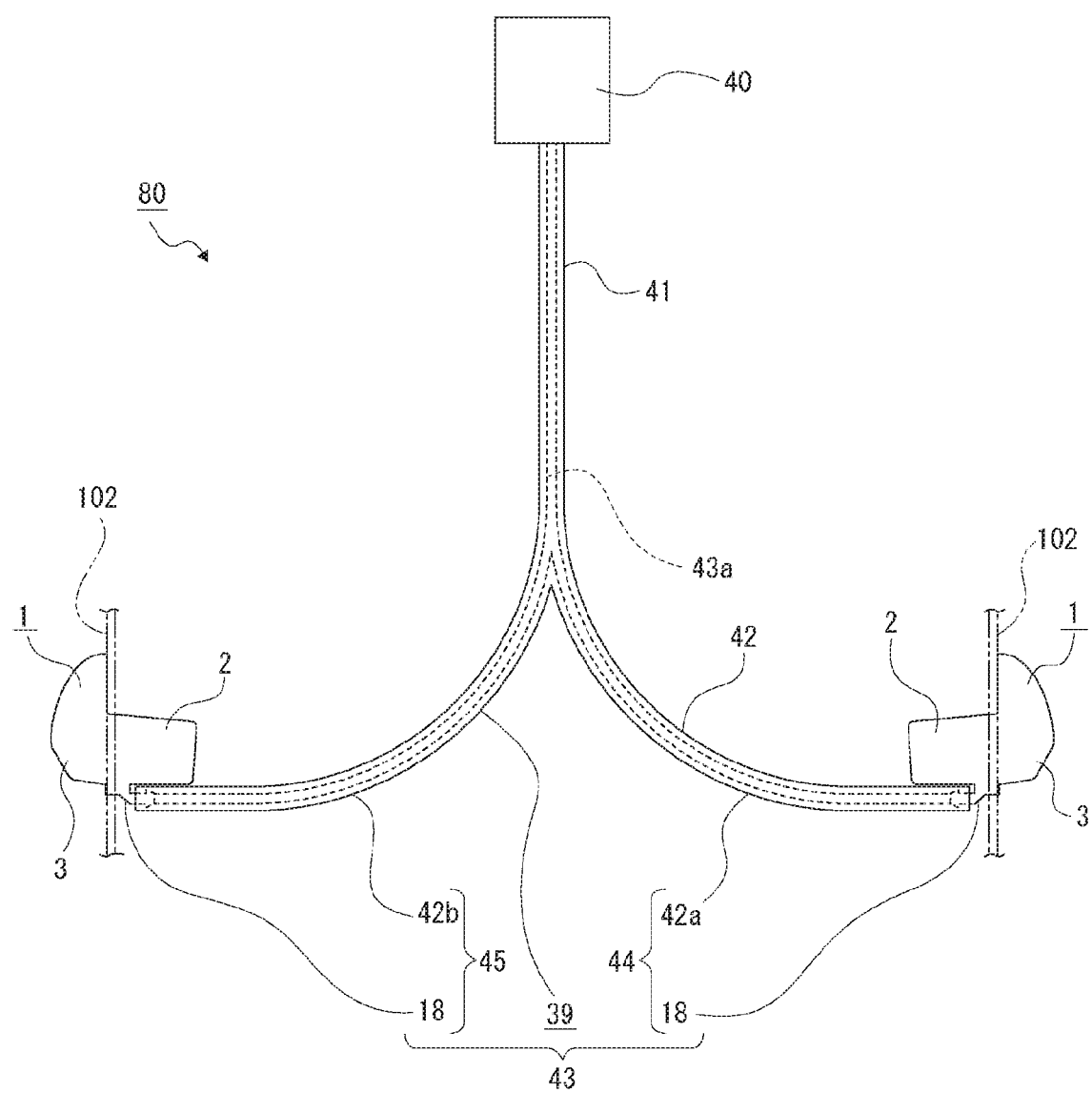
FIG. 21 is a conceptual diagram showing an example of a foreign substance removal system for a vehicle.

Fluid blown onto the transmission window 23a from the nozzle 18 is generated by a fluid supply source 40 such as a pump (see FIG. 21). As described above, the other end of the hose 39 is connected to the fluid supply source 40. The portion of the hose 39 on the side of the fluid supply source 40 is provided as a connection tube portion 41, and the portion thereof other than the connection tube portion 41 is provided as a bifurcated branch portion 42.

The branch portion 42 includes a first flowing portion 42a and a second flowing portion 42b. One end of the first flowing portion 42a is connected to the connection cylinder portion 20 of the nozzle 18 in one of the vehicle lamps 1. One end of the second flowing portion 42b is connected to the connection cylinder portion 20 of the nozzle 18 in the other of the vehicle lamps 1.

The hose 39 and the nozzles 18, 18 are provided as a fluid flowing part 43 for flowing fluid. An internal space of the fluid flowing part 43 is formed as a flow path 43a through which fluid flows. Further, the first flowing portion 42a of the hose 39 and one of the nozzles 18 constitutes a first supply part 44, and the second flowing portion 42b of the hose 39 and the other of the nozzles 18 constitute a second supply part 45.

Fluid such as compressed air generated in the fluid supply source 40 is blown from the hose 39 onto the transmission windows 23*a*, 23*a* through the nozzles 18, 18, respectively. Therefore, when foreign substances such as water droplets or dust are adhered to the transmission window 23*a* these foreign substances are blown off by the fluid and a good incident state of image capturing light from the transmission windows 23*a*, 23*a* to the camera modules 31, 31 is secured, so that a good image can be captured by the camera modules 31, 31.

In this way, the fluid generated in the fluid supply source 40 is blown onto the vehicle lamps 1, 1 through the hose 39, and foreign substances adhered to the transmission windows 23*a*, 23*a* are removed. The vehicle lamps 1, 1, the fluid supply source 40 and the hose 39 constitute a foreign substance removal system 80 for the vehicle 100.

In addition, in the vehicle lamp 1, the nozzle 18 may be formed such that the injection port 19*a* is inclined obliquely downward, and the fluid may be injected from the injection port 19*a* downward from the horizontal direction to blow off foreign substances downward.

Figure 22:
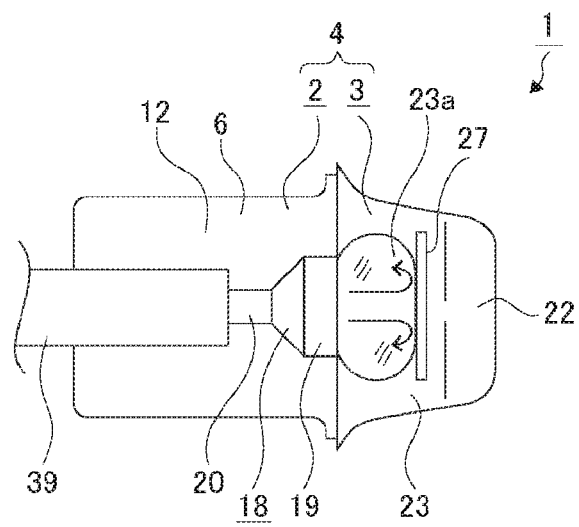
FIG. 22 is a rear view of the vehicle lamp showing an example of the restriction portion provided on the side opposite to an injection port with the transmission window interposed therebetween in a fluid injection direction.

Further, the restriction portion 27 may be provided on the side opposite to the injection port 19*a* with the transmission window 23*a* interposed therebetween in a fluid injection direction (see FIG. 22).

Since the restriction portion 27 is provided on the side opposite to the injection port 19*a* with the transmission window 23*a* interposed therebetween in the fluid injection direction, the path of fluid injected from the injection port 19*a* is changed by the restriction portion 27 (see the arrow in FIG. 22), and the fluid is blown over a wide range of the transmission window 23*a*. Therefore, it is possible to effectively blow off foreign substances from the transmission window 23*a* while restricting the inflow of water droplets to the transmission window 23*a* by the restriction portion 27.

Figure 23:
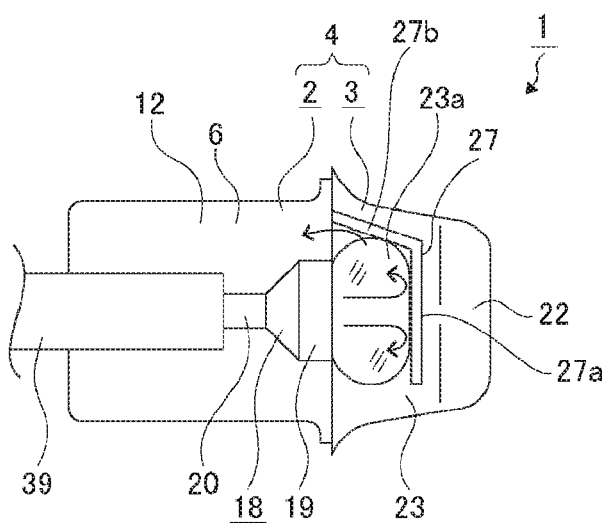
FIG. 23 is a rear view of the vehicle lamp showing an example of the restriction portion having a first wall portion located on the side of the transmission window and a second wall portion located above the transmission window.

Furthermore, the restriction portion 27 may have a first wall portion 27*a* positioned on the side of the transmission window 23*a* and a second wall portion 27*b* positioned on at least one of the upper side and the lower side of the transmission window 23*a* (see FIG. 23).

Since the restriction portion 27 has the first wall portion 27*a* and the second wall portion 27*b*, the path of fluid injected from the injection port 19*a* is changed to a spiral path by the restriction portion 27 (see the arrow in FIG. 23), and the fluid is blown over a wider range of the transmission window 23*a*. Therefore, it is possible to more effectively blow off foreign substances from the transmission window 23*a* while restricting the inflow of water droplets to the transmission window 23*a* by the restriction portion 27.

Figure 24:
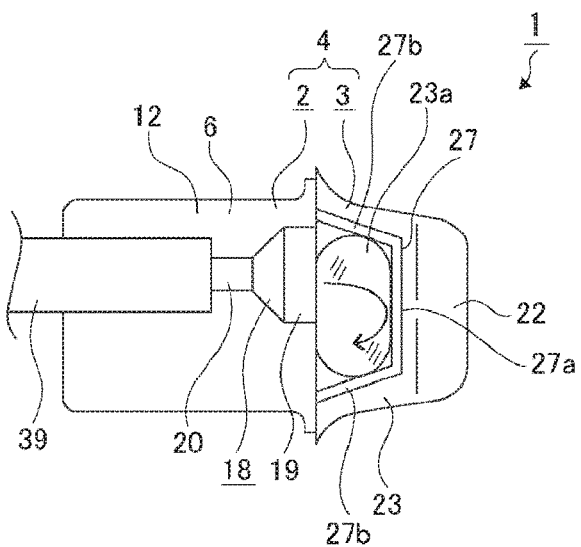
FIG. 24 is a rear view of the vehicle lamp showing an example of the restriction portion located so as to surround the transmission window in a state where a nozzle is provided at a position displaced upward with respect to the transmission window.
Figure 25:
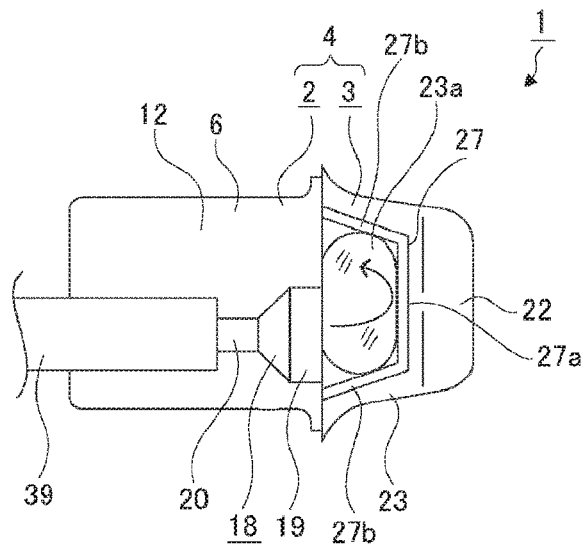
FIG. 25 is a rear view of the vehicle lamp showing an example of the restriction portion located so as to surround the transmission window in a state where the nozzle is provided at a position displaced downward with respect to the transmission window.

In addition, the nozzle 18 may be provided at a position displaced upward with respect to the center portion in the upper and lower direction of the transmission window 23*a*, and the first wall portion 27*a* and the second wall portions 27*b*, 27*b* may be provided in the restriction portion 27 (see FIG. 24). Further, conversely, the nozzle 18 may be provided at a position displaced downward with respect to the center portion in the upper and lower direction of the transmission window 23*a*, and the first wall portion 27*a* and the second wall portions 27*b*, 27*b* may be provided in the restriction portion 27 (see FIG. 25).

By configuring the nozzle 18 and the restriction portion 27 in this way, the path of fluid injected from the injection port 19*a* is more easily changed to a spiral path by the restriction portion 27 (see the arrows in FIGS. 24 and 25), and the fluid is blown over a wider range of the transmission window 23*a*. Therefore, it is possible to more effectively blow off foreign substances from the transmission window 23*a* while restricting the inflow of water droplets to the transmission window 23*a* by the restriction portion 27.

Figure 26:
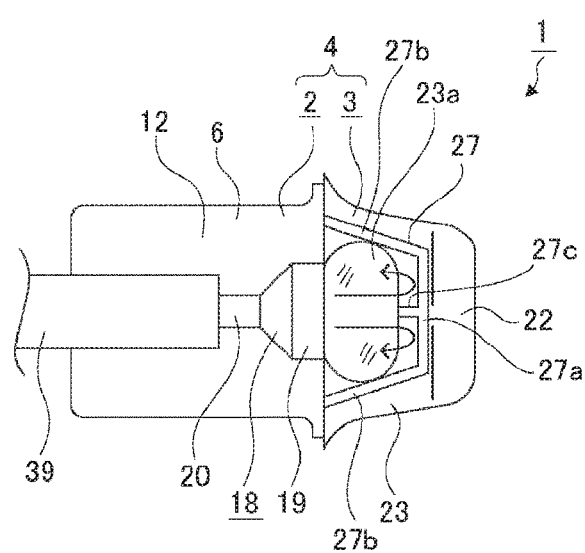
FIG. 26 is a rear view of the vehicle lamp showing an example of the restriction portion located so as to surround the transmission window in a state where the nozzle is provided at a center portion in an upper and lower direction with respect to the transmission window.

Further, the nozzle 18 may be provided at a position corresponding to the center portion in the upper and lower direction of the transmission window 23*a*, the first wall portion 27*a* and the second wall portions 27*b*, 27*b* may be provided in the restriction portion 27, and a partition wall portion 27*c* protruding toward the nozzle 18 from the center portion in the upper and lower direction of the first wall portion 27*a* may be provided (see FIG. 26).

Also by configuring the nozzle 18 and the restriction portion 27 in this way, the path of fluid injected from the injection port 19*a* is more easily changed to a spiral path by the restriction portion 27 (see the arrow in FIG. 26), and the fluid is blown over a wider range of the transmission window 23*a*. Therefore, it is possible to more effectively blow off foreign substances from the transmission window 23*a* while restricting the inflow of water droplets to the transmission window 23*a* by the restriction portion 27.

Figure 27:
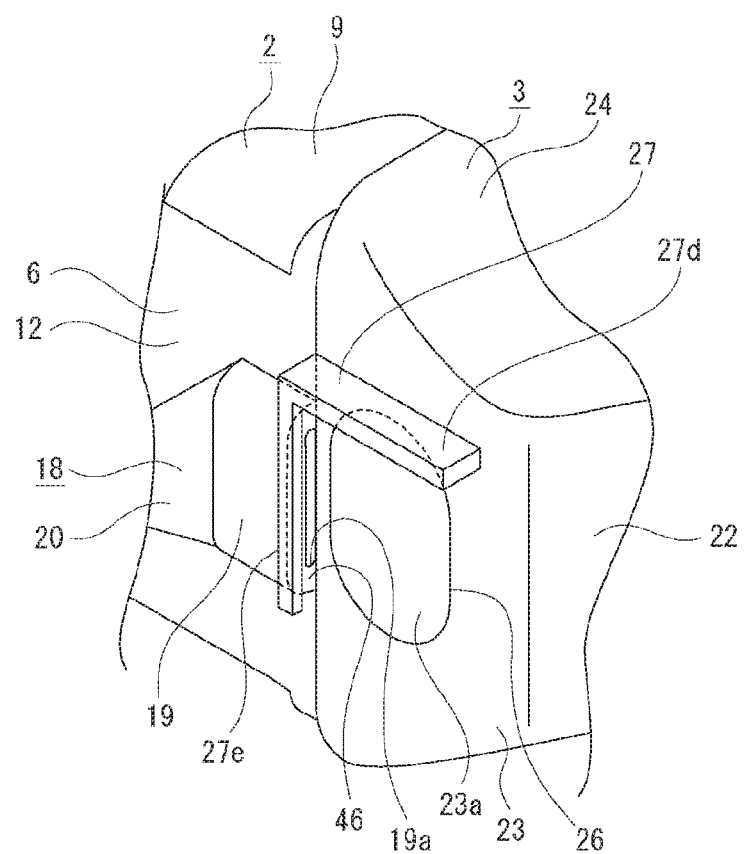
FIG. 27 is a perspective view showing an example of the restriction portion having an eaves portion and a cover portion.

Furthermore, the restriction portion 27 may have an eaves portion 27*d* protruding forward from the flat surface portion 23 and a cover portion 27*e* protruding downward from the left end of the rear end portion of the eaves portion 27*d*, and may be provided at a position continuous to or close to a tip end surface of the injection portion 19 in the vicinity of the injection port 19*a* (see FIG. 27). An internal space of the restriction portion 27 is formed as a passage hole 46 of fluid injected from the injection port 19*a*.

By configuring the restriction portion 27 in this way., the injection port 19*a* is surrounded by the restriction portion 27. Therefore, the intrusion of foreign substances such as water droplets or dust from the injection port 19*a* into the flowing space 18*a* is suppressed by the restriction portion 27, and it is possible to suppress the inflow of water droplets into the transmission window 23*a* and the intrusion of dust from the injection port 19*a* without increasing the number of parts.

Meanwhile, in the above description, a configuration in which the restriction portion 27 has the eaves portion 27*d* and the cover portion 27*e* has been illustrated. However, in addition to the eaves portion 27*d* and the cover portion 27*e*, a wall portion may be provided below the eaves portion 27*d* or on the side of the cover portion 27*e* to form the restriction portion 27 having a U shape as viewed from the rear. Further, in addition to the eaves portion 27*d* and the cover portion 27*e*, wall portions may be respectively provided below the eaves portion 27*d* and on the side of the cover portion 27*e* to form the restriction portion 27 having a frame shape as viewed from the rear.

Further, the restriction portion 27 surrounding the injection port 19*a* may be provided in the housing 2.

By the way, in order to capture a good image by the camera module, fluid may be blown onto the portion of the translucent cover, through which image capturing light is transmitted, to blow off water droplets and suppress the adhesion of water droplets.

However, when foreign substances such as water droplets intrude into the deep side of a flow path of fluid in the configuration of blowing the fluid, good discharging operation of the fluid is hindered, and thus, the effect of removing water droplets on the portion of the translucent cover, through which image capturing light is transmitted, is lowered.

Accordingly, in the vehicle imaging device and the vehicle lamp of the disclosure, it is also desirable to secure a good blowing operation of the fluid by preventing the intrusion of foreign substances such as water droplets into the deep side of the flow path of the fluid.

Figure 28:
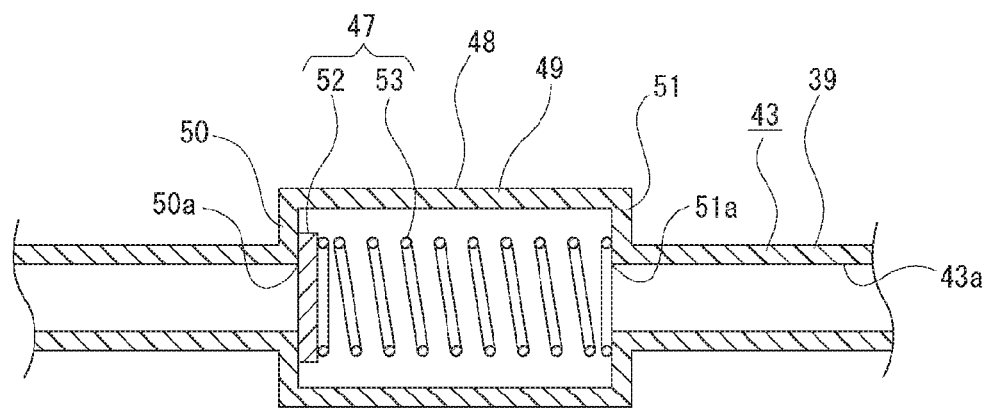
FIG. 28 shows an example of a backflow prevention mechanism together with FIG. 29 and is a sectional view showing a state in which a flow path is blocked.
Figure 29:
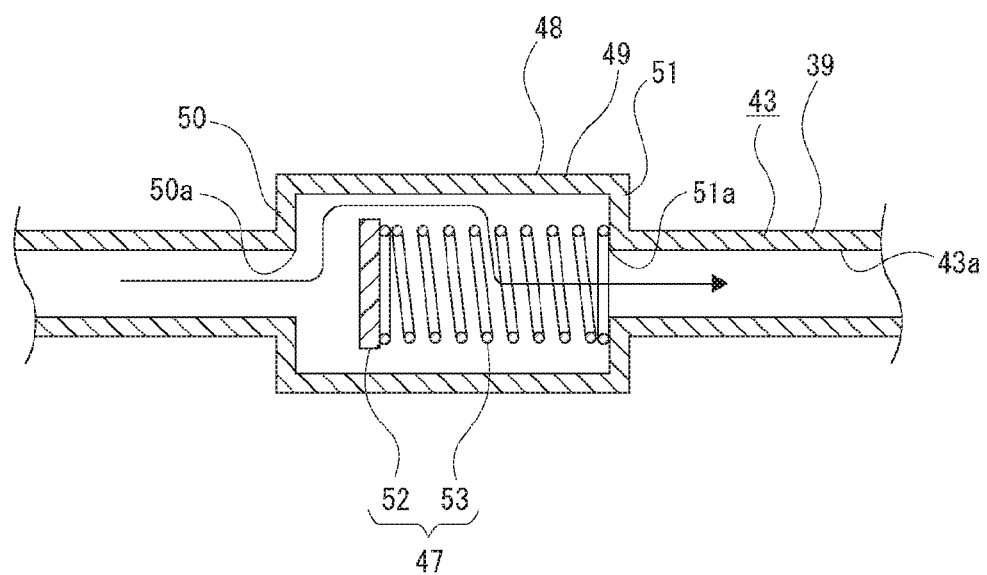
FIG. 29 is a sectional view showing a state in which the flow path is opened.

Therefore, in the following, a backflow prevention mechanism 47 provided in the fluid flowing part 43 will be described (see FIGS. 28 and 29).

In the fluid flowing part 43 provided with the backflow prevention mechanism 47, for example, a mechanism placement part 48 is provided in the hose 39. The mechanism placement part 48 is larger in diameter than the other portions of the hose 39 and has a cylindrical peripheral surface portion 49 and a first closed surface portion 50 and a second closed surface portion 51 inwardly protruding from both axial end portions of the peripheral surface portion 49. An opening of the first closed surface portion 50 is formed as a first opening portion 50a, and an opening of the second closed surface portion 51 is formed as a second opening portion 51a. The first closed surface portion 50 is positioned on the upstream side in a fluid flow direction, and the second closed surface portion 51 is positioned on the downstream side in the fluid flow direction.

The backflow prevention mechanism 47 includes an opening and closing member 52 and a spring 53. The opening and closing member 52 is coupled to one end portion of the spring 53, and the other end portion of the spring 53 is coupled to an inner peripheral portion of the second closed surface portion 51. The spring 53 is, for example, a compression coil spring.

In the above configuration, in a state where fluid is not supplied from the fluid supply source 40 to the hose 39, the spring 53 is expanded and the opening and closing member 52 is pressed against the first closed surface portion 50. And, the first opening portion 50a is closed by the opening and closing member 52 and the flow path 43a is closed (see FIG. 28). Therefore, in the hose 39, the backflow of water droplets toward the fluid supply source 40 is prevented.

When fluid is supplied from the fluid supply source 40 to the hose 39, the pressure of the fluid is applied to the opening and closing member 52. The spring 53 is compressed by the applied pressure and the opening and closing member 52 is moved toward the second closed surface portion 51 (see FIG. 29). Therefore, the first opening portion 50a closed is opened and the flow path 43a is opened. Then, the fluid flows from the first opening portion 50a into the mechanism placement part 48 and flows toward the nozzle 18 through the second opening portion 51a.

As described above, in the vehicle lamp 1, the backflow prevention mechanism 47 is provided in the fluid flowing part 43. Therefore, the intrusion of foreign substances such as water droplets and dust into the deep side of the flow path 43a of the fluid is prevented by the backflow prevention mechanism 4, so that it is possible to secure a good injection operation of the fluid.

Further, a spring member 53 expanded and contracted by the pressure of fluid and the opening and closing member 52 opening and closing the flow path 43a according to the expanded/contracted state of the spring member 53 are provided in the backflow prevention mechanism 47.

Accordingly, since the flow path 43a is opened and closed by the opening and closing member 52 in accordance with the expansion and contraction of the spring member 53 due to the pressure of fluid, the backflow can be prevented by a simple structure.

Meanwhile, in the above description, an example in which the backflow prevention mechanism 47 is provided in the hose 39 has been illustrated. However, the backflow prevention mechanism 47 may be provided in the nozzle 18.

Hereinafter, modifications of the backflow prevention mechanism will be described (see FIGS. 30 to 33). Each of backflow prevention mechanisms 47A, 47B, 47C, 47D according to modifications described below is configured by an opening and closing valve formed integrally with the elastically deformable hose 39 formed of a rubber material or the like.

Figure 30:
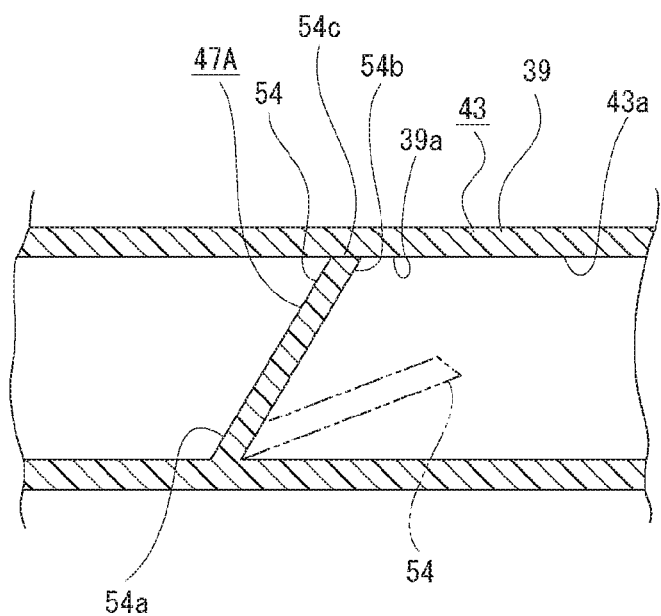
FIG. 30 is a sectional view showing a backflow prevention mechanism according to a first modification.

The backflow prevention mechanism 47A according to a first modification is configured by a plate-like opening and closing valve 54 having an approximately elliptical shape, and one end portion 54a of the opening and closing valve 54 is continuous to an inner peripheral surface 39a of the hose 39 (see FIG. 30). The opening and closing valve 54 is provided in a state of being inclined with respect to the fluid flow direction, and the one end portion 54a is positioned on the upstream side in the flow direction from the other end portion 54b.

When the fluid is not flowing, an outer peripheral surface 54c of the opening and closing valve 54 is brought into close contact with the inner peripheral surface 39a of the hose 39, and the flow path 43a is closed (see the state shown by the solid line in FIG. 30). On the other hand, when the fluid is flowing, the opening and closing valve 54 is elastically deformed by the pressure of the fluid and further inclined to the downstream side in the flow direction, and the flow path 43a is opened (see the state shown by the broken line in FIG. 30).

Figure 31:
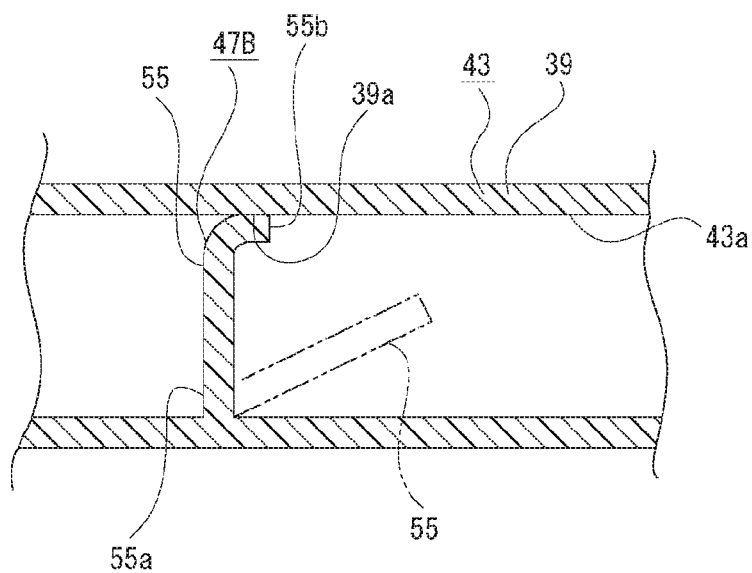
FIG. 31 is a sectional view showing a backflow prevention mechanism according to a second modification.

The backflow prevention mechanism 47B according to a second modification is configured by an opening and closing valve 55 having a substantially disc shape, and one end portion 55a of the opening and closing valve 55 is continuous to the inner peripheral surface 39a of the hose 39 (see FIG. 31). The opening and closing valve 55 is provided in a state of being perpendicular to the fluid flow direction. The opening and closing valve 55 is formed in a shape in which its outer peripheral portion 55b other than the one end portion 55a is bent to the downstream side in the flow direction.

When the fluid is not flowing, the outer peripheral portion 55b of the opening and closing valve 55 is brought into close contact with the inner peripheral surface 39a of the hose 39, and the flow path 43a is closed (see the state shown by the solid line in FIG. 31). On the other hand, when the fluid is flowing, the opening and closing valve 55 is elastically deformed by the pressure of the fluid and inclined to the downstream side in the flow direction, and the flow path 43a is opened (see the state shown by the broken line in FIG. 31).

As described above, in the backflow prevention mechanisms 47A, 47B, the opening and closing valves 54, 55 are entirely or partially inclined or bent to the downstream side in the fluid flow direction, and the inclination thereof to the upstream side in the fluid flow direction is restricted.

Therefore, since the flow path 43a is opened by the opening and closing valves 54, 55 only when the fluid is flowing, a smooth flowing state of the fluid can be secured by a simple structure, and it is possible to prevent the intrusion of foreign substances into the flow path 43a when the fluid is not flowing.

Figure 32:
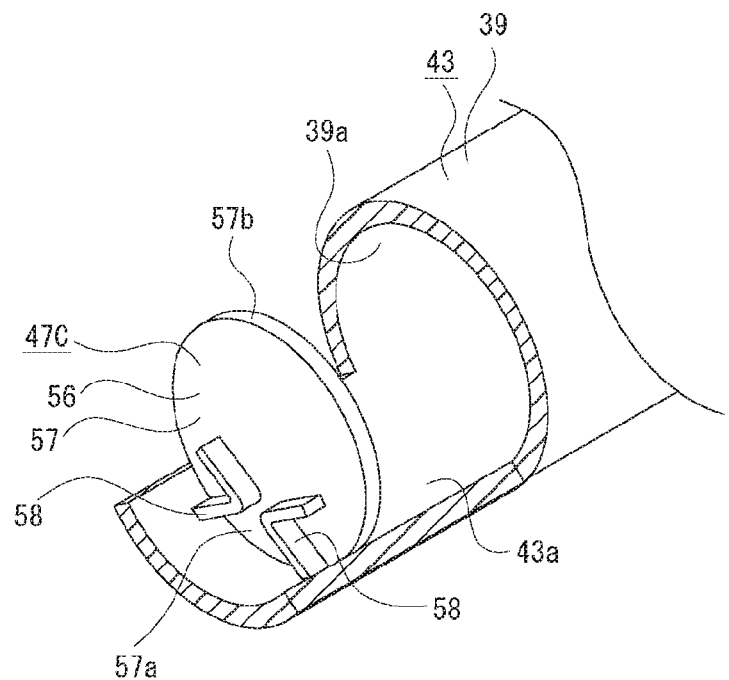
FIG. 32 is a perspective view of a backflow prevention mechanism according to a third modification, showing a part thereof in section.

The backflow prevention mechanism 47C according to a third modification is configured by an opening and closing valve 56 (see FIG. 32). The opening and closing valve 56 includes an opening and closing plate portion 57 having a substantially disc shape and deformation restricting portions 58, 58 protruding from one surface of the opening and closing plate portion 57. The deformation restricting portions 58, 58 are provided on the surface of the opening and closing plate portion 57 facing the upstream side in the fluid flow direction and are formed, for example, in a toppled V shape.

The opening and closing valve 56 is provided in a state where the opening and closing plate portion 57 is perpendicular to the fluid flow direction, and one end portion 57a of the opening and closing plate portion 57 is continuous to the inner peripheral surface 39a of the hose 39. Since the deformation restricting portions 58, 58 are provided on the surface of the opening and closing valve 56 facing the upstream side in the fluid flow direction, the opening and closing valve 56 is not easily inclined to the upstream side but easily inclined to the downstream side.

When the fluid is not flowing, an outer peripheral surface 57b of the opening and closing plate portion 57 is brought into close contact with the inner peripheral surface 39a of the hose 39, and the flow path 43a is closed. On the other hand, when the fluid is flowing, the opening and closing valve 56 is elastically deformed by the pressure of the fluid and inclined to the downstream side in the flow direction, and the flow path 43a is opened.

Figure 33:
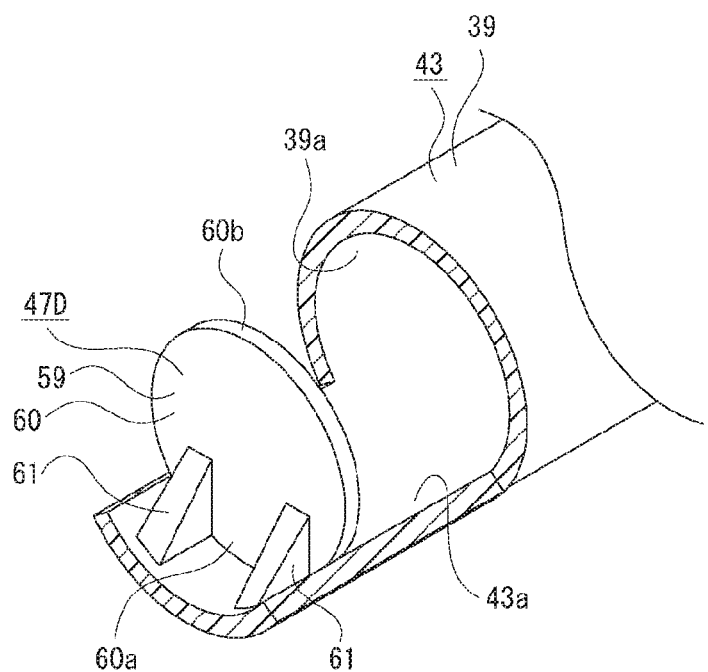
FIG. 33 is a perspective view of a backflow prevention mechanism according to a fourth modification, showing a part thereof in section.

The backflow prevention mechanism 47D according to a fourth modification is configured by an opening and closing valve 59 (see FIG. 33). The opening and closing valve 59 includes an opening and closing plate portion 60 having a substantially disc shape and deformation restricting portions 61, 61 protruding from one surface of the opening and closing plate portion 60. The deformation restricting portions 61, 61 are provided on the surface of the opening and closing plate portion 60 facing the upstream side in the fluid flow direction and positioned to be separated from each other in a circumferential direction of the hose 39. The deformation restricting portions 61, 61 are formed in shapes connecting the opening and closing plate portion 60 and the inner peripheral surface 39a of the hose 39.

The opening and closing valve 59 is provided in a state where the opening and closing plate portion 60 is perpendicular to the fluid flow direction, and one end portion 60a of the opening and closing plate portion 60 is continuous to the inner peripheral surface 39a of the hose 39. The deformation restricting portions 61, 61 protrude from the one end portion 60a.

Since the deformation restricting portions 61, 61 connecting the opening and closing plate portion 60 and the hose 39 are provided on the surface of the opening and closing valve 59 facing the upstream side in the fluid flow direction, the opening and closing valve 59 is not easily inclined to the upstream side but easily inclined to the downstream side.

When the fluid is not flowing, an outer peripheral surface 60b of the opening and closing plate portion 60 is brought into close contact with the inner peripheral surface 39a of the hose 39, and the flow path 43a is closed. On the other hand, when the fluid is flowing, the opening and closing valve 59 is elastically deformed by the pressure of the fluid and inclined to the downstream side in the flow direction, and the flow path 43a is opened.

As described above, the opening and closing valves 56, 59, which are elastically deformed to open the flow path 43a, are provided in the backflow prevention mechanisms 47C, 47D. And, the deformation restricting portions 58, 61, which restrict the deformation in the direction opposite to the fluid flow direction, are provided in the opening and closing valves 56, 59.

Accordingly, when the fluid is not flowing, the flow path 43a is closed in a state where the deformation of the opening and closing valves 56, 59 is restricted by the deformation restricting portions 58, 61, and only when the fluid is flowing, the flow path 43a is opened by the opening and closing valves 56, 59. In this way, a smooth flowing state of the fluid can be secured by a simple structure, and it is possible to prevent the intrusion of foreign substances into the flow path 43a when the fluid is not flowing.

Next, the backflow prevention mechanism 47E in which the flow path 43a is opened and closed by a part of a packing will be described (see FIGS. 34 and 35).

In the present example, a packing 62 serving as the backflow prevention mechanism 47E is disposed between the housing 2 and the translucent cover 3. The packing 62 is annularly formed of an elastically deformable material such as rubber. The packing 62 excluding a part is disposed between an outer peripheral portion of the cover mounting portion 7 of the housing 2 and an outer peripheral portion of the translucent cover 3 and has a waterproof function for the lamp chamber 5.

Further, in the present example, a pressing protrusion 3c protruding rearward from a rear end portion of an outer peripheral edge of the translucent cover 3 is provided. The pressing protrusion 3c is positioned to face a tip end surface (right surface) 19b of the injection portion 19 of the nozzle 18.

A portion of the packing 62 is also positioned between the pressing protrusion 3c of the translucent cover 3 and the tip end surface 19b of the injection portion 19. This portion is provided as a valve forming portion 63. The valve forming portion 63 is provided with a valve portion 63a. A slit 62a is formed in a portion of the packing 62, and the valve portion 63a is formed as a portion inside the slit 62a.

Figure 34:
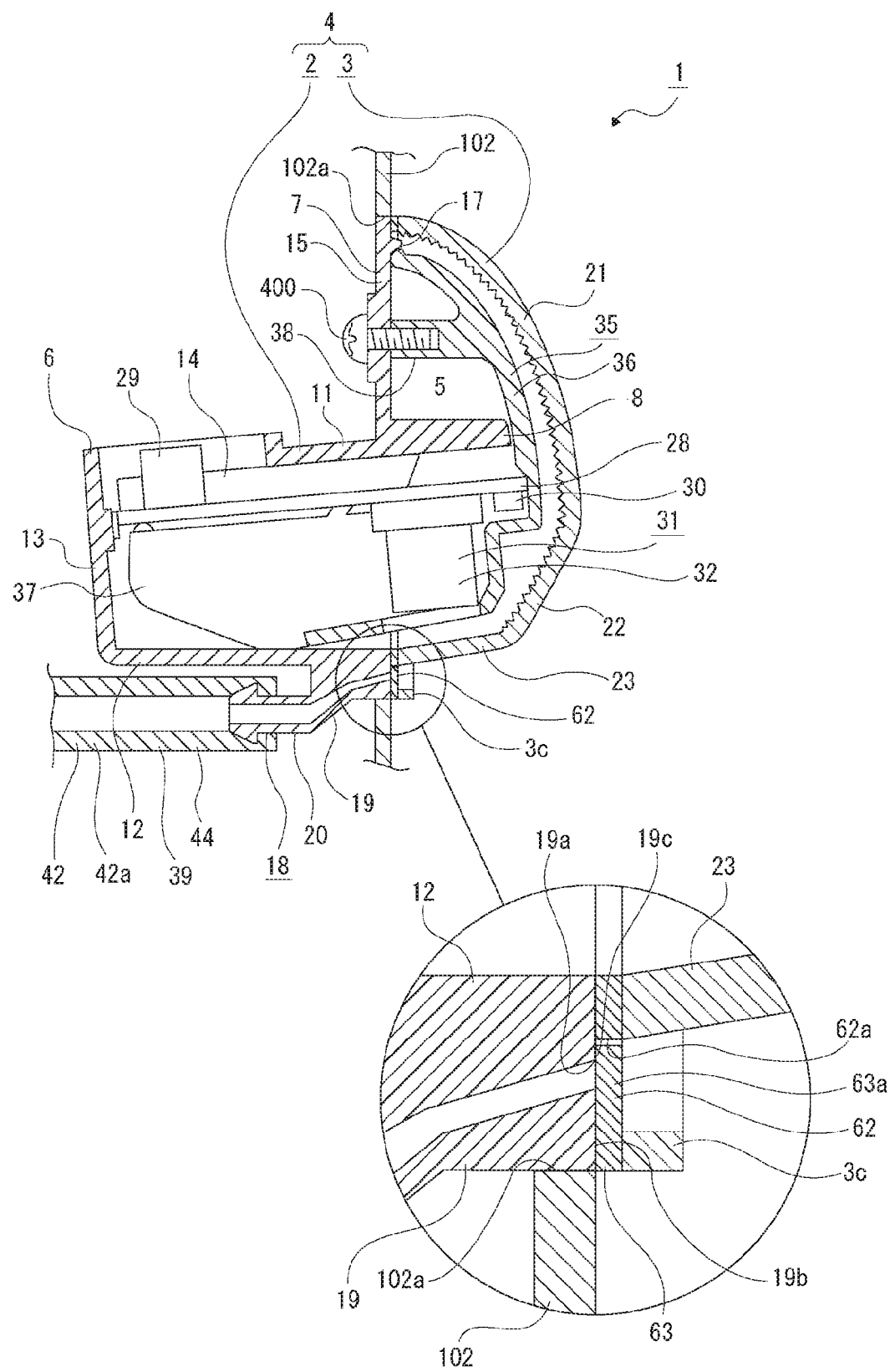
FIG. 34 shows an example of the backflow prevention mechanism, together with FIG. 35, in which the flow path is opened and closed by a part of a packing.
Figure 35:
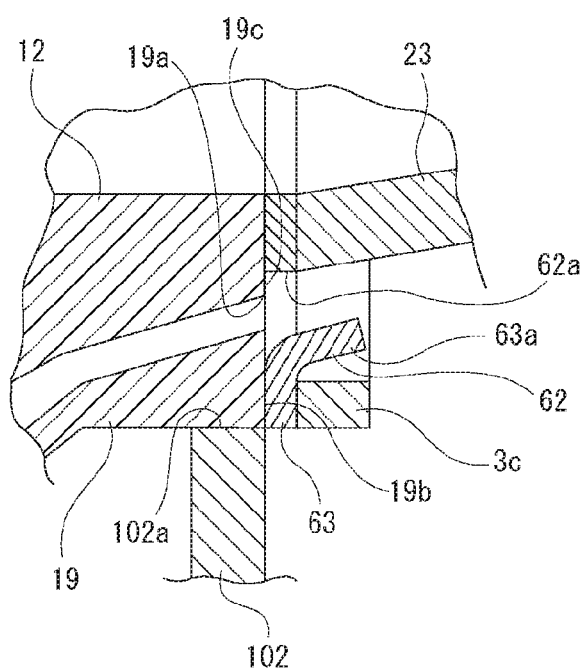
FIG. 35 is a sectional view of the vehicle lamp showing a state in which the flow path is opened.

When the fluid is not flowing, an outer peripheral portion of the valve portion 63a is brought into close contact with the tip end surface 19b of the injection portion 19, and the injection port 19a of the injection portion 19 is closed (see FIG. 34). The portion of the injection portion 19, with which the outer peripheral portion of the valve portion 63a is brought into close contact, is a deformation restricting portion 19c. The deformation of the valve portion 63a is restricted by the deformation restricting portion 19c. On the other hand, when the fluid is flowing, the valve portion 63a is elastically deformed and inclined by the pressure of the fluid, and the flow path 43a is opened (see FIG. 35).

In the configuration in which a part of the packing 62 for waterproofing disposed between the housing 2 and the translucent cover 3 is provided as the valve portion 63a in this way, a part of the packing 62 is deformed by the pressure of the fluid, and the flow path 43a is opened and closed. Therefore, it is possible to prevent foreign substances from intruding into the flow path 43a with a simple structure without increasing the number of parts while securing the high waterproofness of the vehicle lamp 1.

Next, the backflow prevention mechanism 47F in which the flow path 43a is opened and closed by a rotary valve will be described (see FIGS. 36 to 38).

Figure 36:
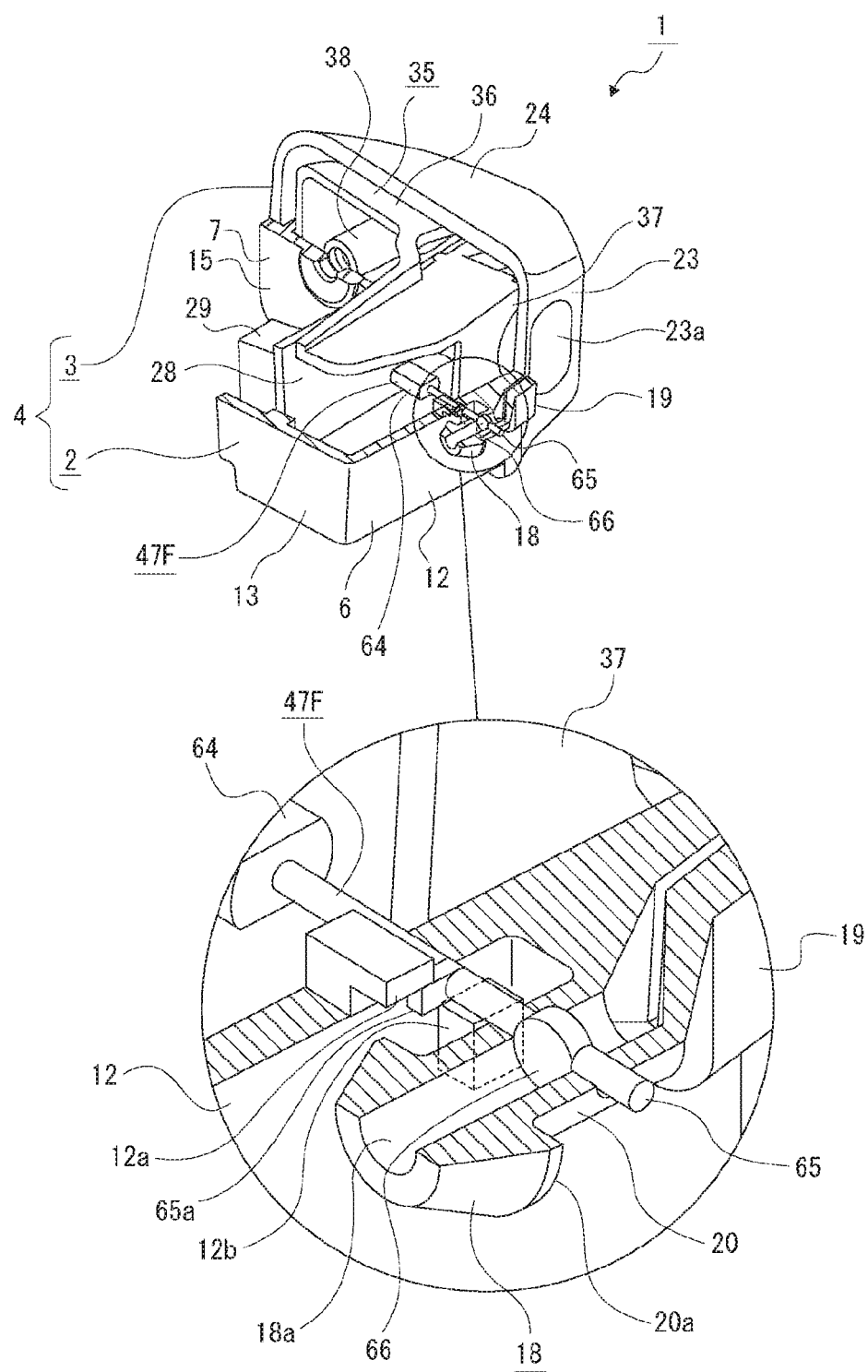
FIG. 36 shows an example of the backflow prevention mechanism, together with FIGS. 37 and 38, in which the flow path is opened and closed by a rotary valve.
Figure 37:
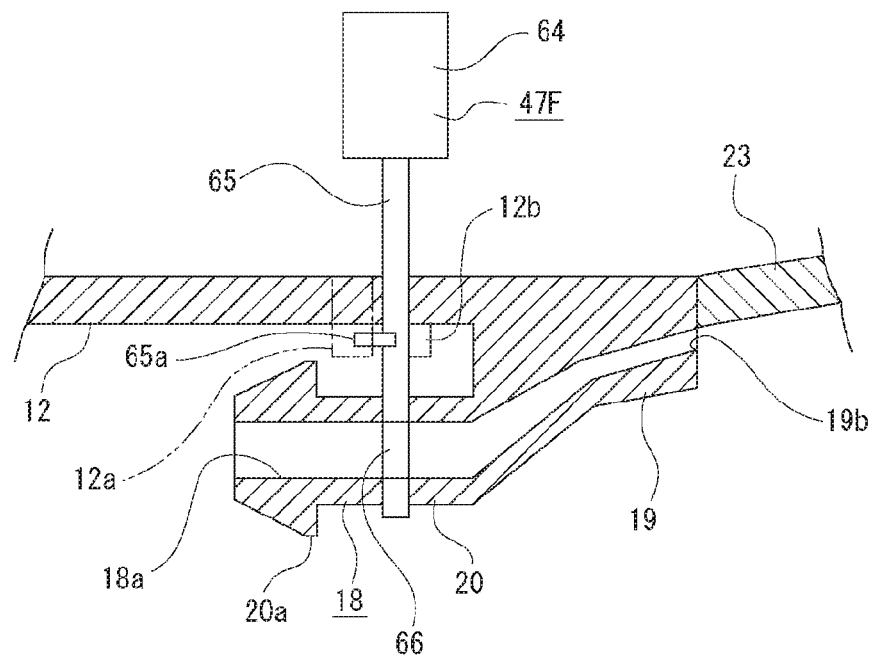
FIG. 37 is a sectional view showing a state in which the flow path is blocked by the rotary valve.

The backflow prevention mechanism 47F includes a drive motor 64, a shaft 65, and a rotary valve 66 (see FIGS. 36 and 37).

The drive motor 64 is, for example, a stepping motor or a direct current motor. The drive motor 64 is disposed inside the housing 2 and controlled by a drive circuit formed in the substrate 28.

The shaft 65 has an axial direction oriented in the front and rear direction and is coupled to a motor shaft of the drive motor 64. The shaft 65 passes through the rear surface portion 12 of the housing 2 and the connection cylinder portion 20 of the nozzle 18 and is rotated relative to the housing 2 by a driving force of the drive motor 64. The shaft 65 is provided with a stopper protrusion 65a to be stopped protruding in a direction orthogonal to the axial direction.

The stopper protrusion 65a to be stopped is positioned between the rear surface portion 12 and the connection cylinder portion 20.

The rotary valve 66 is provided at a position near a rear end of the shaft 65 and is formed, for example, in a substantially disc shape. The rotary valve 66 is positioned inside the connection cylinder portion 20 has an outer diameter substantially equal to an inner diameter of the connection cylinder portion 20. The rotary valve 66 is rotated between a closed position and an opened position.

A first stopper protrusion 12a and a second stopper protrusion 12b are provided on an outer surface of the rear surface portion 12 of the housing 2 and spaced apart from each other in the upper and lower direction. The first stopper protrusion 12a and the second stopper protrusion 12b are positioned between the rear surface portion 12 and the connection cylinder portion 20.

In the backflow prevention mechanism 47F, when the shaft 65 is rotated by a driving force of the drive motor 64, the rotary valve 66 is rotated inside the connection cylinder portion 20 in accordance with the rotation of the shaft 65.

When the stopper protrusion 65a to be stopped comes into contact with the first stopper protrusion 12a as the shaft 65 is rotated to one side, the rotation of the shaft 65 to one side is restricted (see FIG. 36). At this time, the rotary valve 66 is rotated to the closed position, the center axis of the rotary valve 66 coincides with the center axis of the connection cylinder portion 20, and the flow path 43a is closed by the rotary valve 66. As the flow path 43a is closed, the injection of fluid from the injection port 19a becomes not possible.

Figure 38:
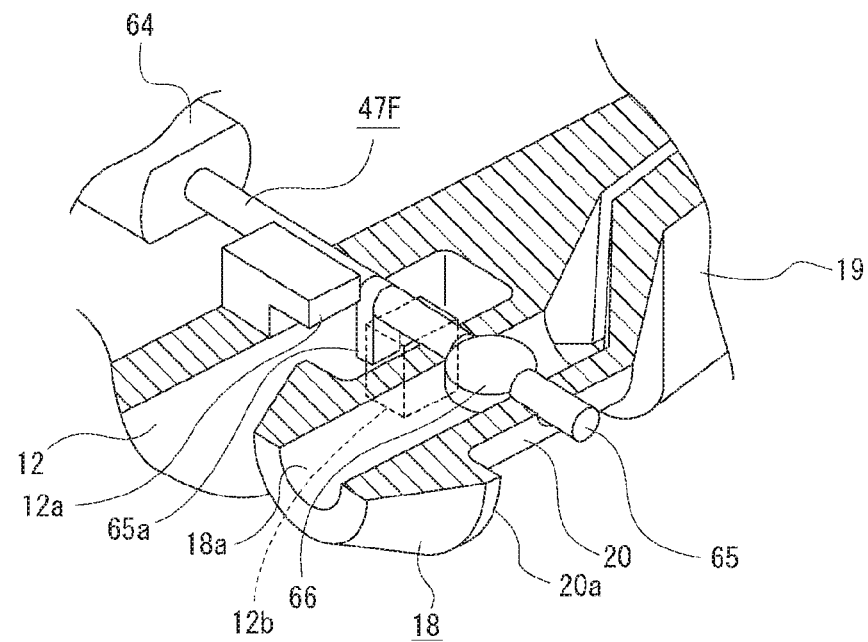
FIG. 38 is a perspective view showing a state in which the flow path is opened by the rotary valve and showing a part thereof in section.

On the contrary, when the stopper protrusion 65a to be stopped comes into contact with the second stopper protrusion 12b as the shaft 65 is rotated to the other side, the rotation of the shaft 65 to the other side is restricted (see FIG. 38). At this time, the rotary valve 66 is rotated to the opened position, the center axis of the rotary valve 66 is orthogonal to the center axis of the connection cylinder portion 20, and the flow path 43a is opened by the rotary valve 66. As the flow path 43a is opened, the injection of fluid from the injection port 19a becomes possible.

In the configuration in which the backflow prevention mechanism 47F is provided in this way, the flow path 43a is opened and closed by the rotary valve 66 according to the rotational position of the shaft 65. Therefore, by controlling the rotation of the shaft 65 as necessary, it is possible to secure a good injection operation of fluid, and it is possible to prevent the intrusion of foreign substances from the injection port 19a into the flow path 43a.

By the way, in order to capture a good image by the camera module, fluid may be blown onto the portion of the translucent cover, through which image capturing light is transmitted, to blow off water droplets and suppress the adhesion of water droplets.

However, when water droplets intrude into the deep side of an injection portion of fluid in the configuration of blowing the fluid, good discharging operation of the fluid is hindered, and thus, the effect of removing water droplets on the portion of the translucent cover, through which image capturing light is transmitted, is lowered.

Accordingly, in the vehicle imaging device and the vehicle lamp of the disclosure, it is also desirable to secure a good blowing operation of the fluid by suppressing the intrusion of water droplets into the deep side of the injection portion of the fluid.

Therefore, in the following, examples in which a water droplet guide portion is provided in order to suppress the intrusion of water droplets from the side of the injection port 19a of the injection portion 19 to the hose 39 will be described (see FIGS. 39 and 47).

Figure 39:
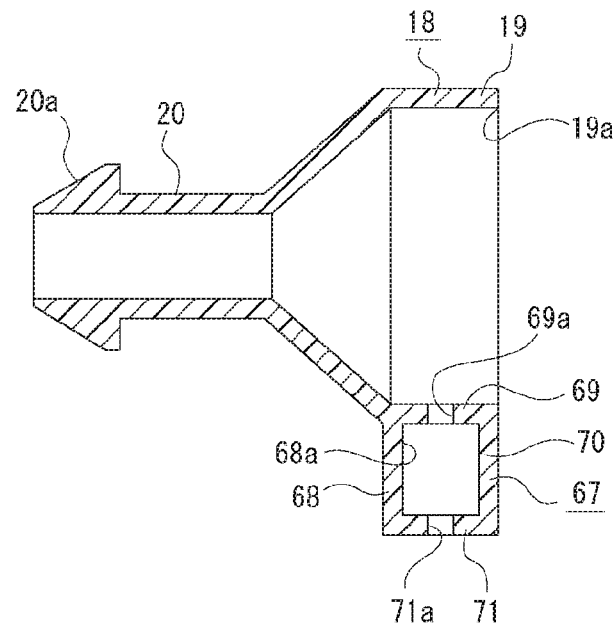
FIG. 39 is a sectional view showing, together with FIGS. 40 to 47, the examples in which a water droplet guide portion is provided.

As a water droplet guide portion 67, for example, a water reservoir case 68 is provided at a lower end portion of the injection portion 19 (see FIG. 39). The water reservoir case 68 is formed in a box shape and is formed integrally with an end portion on the side of the injection port 19a of the injection portion 19. The water reservoir case 68 has an upper surface portion 69, a peripheral surface portion 70, and a bottom surface portion 71.

In the water reservoir case 68, a water fall hole 69a penetrating in the upper and lower direction is formed in the upper surface portion 69, and a water drain hole 71a penetrating in the upper and lower direction is formed in the bottom surface portion 71.

In the vehicle lamp 1 provided with the water reservoir case 68, when water droplets intrude from the injection port 19a, the intruded water droplets are dropped from the water fall hole 69a into an internal space 68a of the water reservoir case 68 and dropped from the water drain hole 71a and injected to the outside. In this way, the intrusion of water droplets to the side of the hose 39 is suppressed.

As described above, as the water droplet guide portion 67, the water reservoir case 68 opened at least upward is provided at the lower end portion of the injection portion 19, so that water droplets intruded from the injection port 19a are guided to the water reservoir case 68 and accumulated therein. Therefore, it is possible to suppress the intrusion of water droplets into the deep side of the injection portion 19 without increasing the number of parts.

Further, since the water drain hole 71a is formed in the bottom surface portion 71 of the water reservoir case 68, the water droplets accumulated in the water reservoir case 68 are injected to the outside from the water drain hole 71a, and the water droplets do not stay in the water reservoir case 68. In this way, it is possible to effectively suppress the intrusion of water droplets into the deep side of the injection portion 19.

In addition, the water fall hole 69a of the upper surface portion 69 may be formed in an end portion on the side of the injection port 19a, and the upper surface portion 69 may be inclined to be displaced downward as it approaches the injection port 19a. When the water fall hole 69a is formed in the end portion on the side of the injection port 19a and the upper surface portion 69 is inclined to be displaced downward as it approaches the injection port 19a, water droplets entering from the injection port 19a are liable to drop into the water reservoir case 68, and it is possible to more effectively suppress the intrusion of water droplets into the deep side of the injection portion 19.

Figure 40:
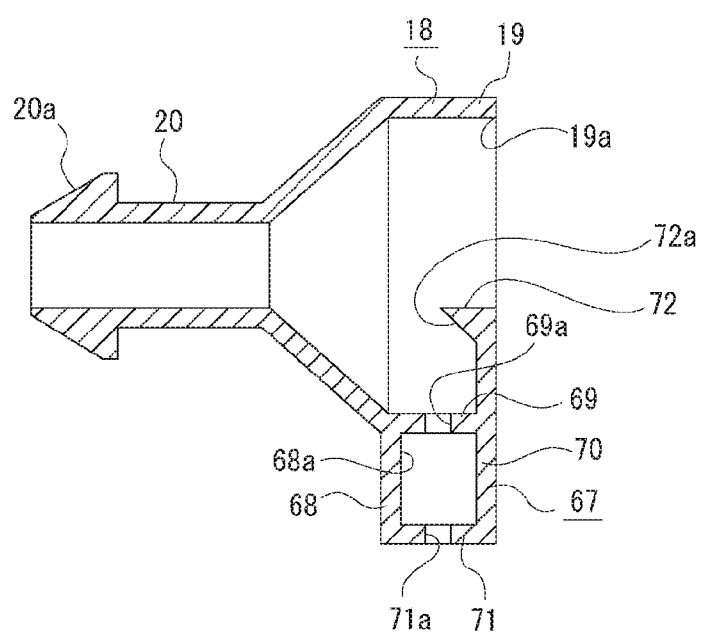
FIG. 40 is a sectional view showing an example in which a wind guide portion is provided.

Further, a wind guide portion 72 may be provided by extending a wall portion of the water reservoir case 68 on the side of the injection port 19a upward (see FIG. 40). It is desirable to form an inclined surface 72a in the wind guide portion 72. The inclined surface 72a is displaced toward the connection cylinder portion 20 as it goes upward.

When the wind guide portion 72 is provided in the water reservoir case 68, a part of fluid flowing toward the injection port 19a is guided downward by the wind guide portion 72. Therefore, water droplets are easily guided downward of the water reservoir case 68. In particular, when the inclined surface 72a is formed, the fluid is likely to flow downward along the inclined surface 72a, and water droplets are more easily guided downward of the water reservoir case 68.

Figure 41:
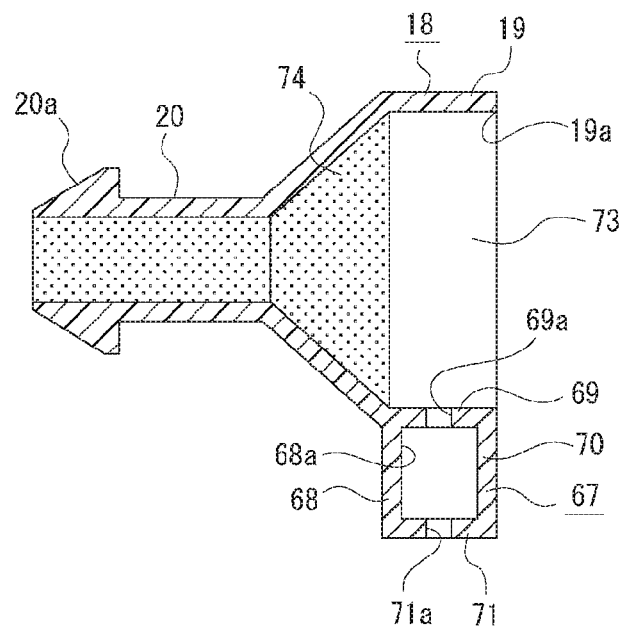
FIG. 41 is a sectional view showing an example in which an injection side region is formed as a smooth surface and an inner side region is formed as a rough surface.

Further, of the inner surface of the injection portion 19, a region on the upper side of the water reservoir case 68 is defined as an injection-side region 73, and a region on the deep side from the injection-side region 73 is defined as a deep-side region 74. At this time, the injection-side region 73 may be formed as a smooth surface, and the deep-side region 74 may be formed as a roughened surface by embossing or the like (see FIG. 41).

When the injection-side region 73 is formed as a smooth surface as described above, water droplets are liable to flow downward in the injection-side region 73. When the deep-side region 74 is formed as a roughened surface as described above, water droplets are repelled in the deep-side region 74 and are unlikely to stay there. Therefore, water droplets are liable to flow toward the water reservoir case 68, and it is possible to further suppress the intrusion of water droplets into the hose 39.

Figure 42:
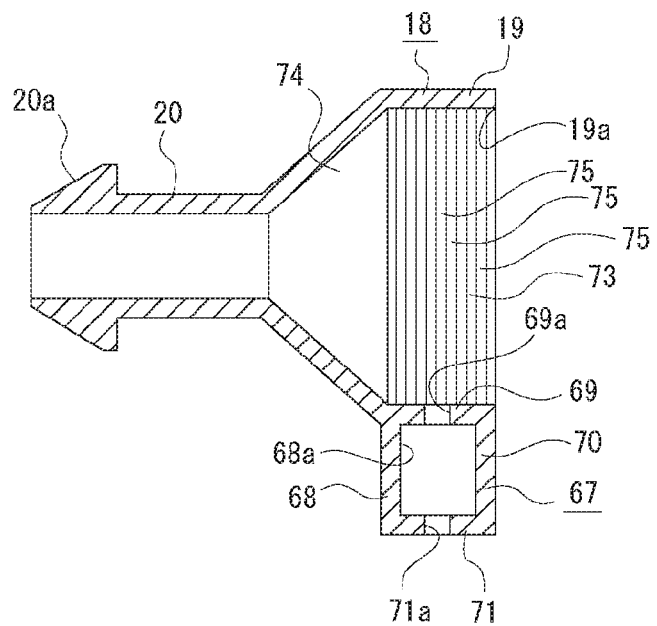
FIG. 42 is a sectional view showing an example in which guide grooves extending in the upper and lower direction are formed in the injection side region.
Figure 43:
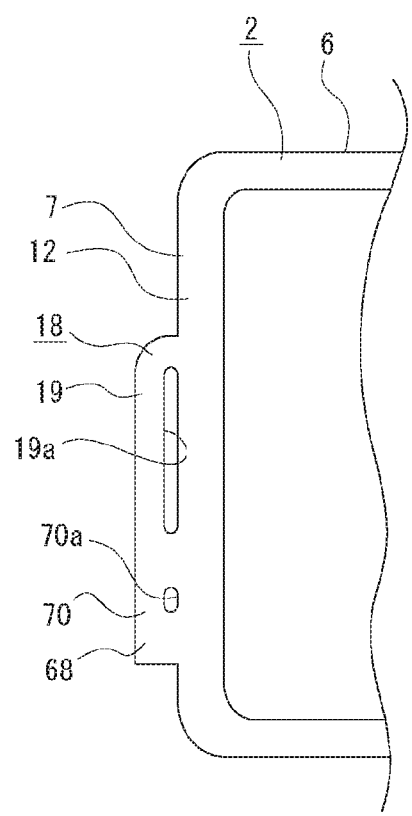
FIG. 43 is a side view showing an example in which an air inlet hole is formed in a peripheral surface portion of a water reservoir case.

Furthermore, guide grooves 75, 75, ... extending in the upper and lower direction may be formed side by side in the left and right direction in the injection-side region 73 (see FIG. 42).

When the guide grooves 75, 75, ... extending in the upper and lower direction are formed in the injection-side region 73 in this way, water droplets are liable to flow downward in the injection-side region 73, and water droplets are liable to flow toward the water reservoir case 68. Therefore, it is possible to further suppress the intrusion of water droplets into the hose 39.

Moreover, the injection-side region 73 may be formed as a high hydrophilicity region, and the deep-side region 74 may be formed as a high water repellency region. In order to form the injection-side region 73 as a high hydrophilicity region and form the deep-side region 74 as a high water repellency region, for example, the injection-side region 73 and the deep-side region 74 may be subjected to desired surface treatment, respectively, and the injection-side region 73 and the deep-side region 74 may be formed of a desired material by selecting the desired material, respectively.

When the injection-side region 73 is formed as a high hydrophilicity region and the deep-side region 74 is formed as a high water repellency region in this way, water droplets are liable to flow downward in the injection-side region 73 and are unlikely to stay in the deep-side region 74. And, water droplets are liable to flow toward the water reservoir case 68. Therefore, it is possible to further suppress the intrusion of water droplets into the hose 39.

In addition, the water reservoir case 68 is provided at the lower end portion of the injection portion 19, and the flow rate of air around the injection portion 19 generated during the travel of a vehicle is different between the vicinity of the injection port 19a and the vicinity of the water reservoir case 68. That is, the injection port 19a is present at a position corresponding to the center portion in the upper and lower direction of the translucent cover 3, and the water reservoir case 68 is present at a position corresponding to the lower end portion of the translucent cover 3. Further, the translucent cover 3 serves as a resistance against the flow of air while air flowing under the translucent cover 3 is not subjected to resistance. Therefore, the flow rate of air flowing in the vicinity of the injection port 19a is slower than the flow rate of air flowing in the vicinity of the water reservoir case 68.

In order to utilize such a difference in the flow rate, an air inlet hole 70a can be formed at a position right below the injection port 19a in the peripheral surface portion 70 of the water reservoir case 68. Air generated during the travel of a vehicle is introduced from the air inlet hole 70a and the injection port 19a, respectively. However, since the flow rate of the injection portion 19 is slower on the upper side as described above, the pressure in the upper space of the water reservoir case 68 in the injection portion 19 is liable to be higher than the pressure in the internal space 68a of the water reservoir case 68.

Accordingly, since the pressure in the internal space of the injection portion 19 is lower on the lower side when the air inlet hole 70a is formed, water droplets introduced from the injection port 19a are liable to flow to the lower side where pressure is lower. In this way, it is easy to guide water droplets to the internal space 68a of the water reservoir case 68.

Figure 44:
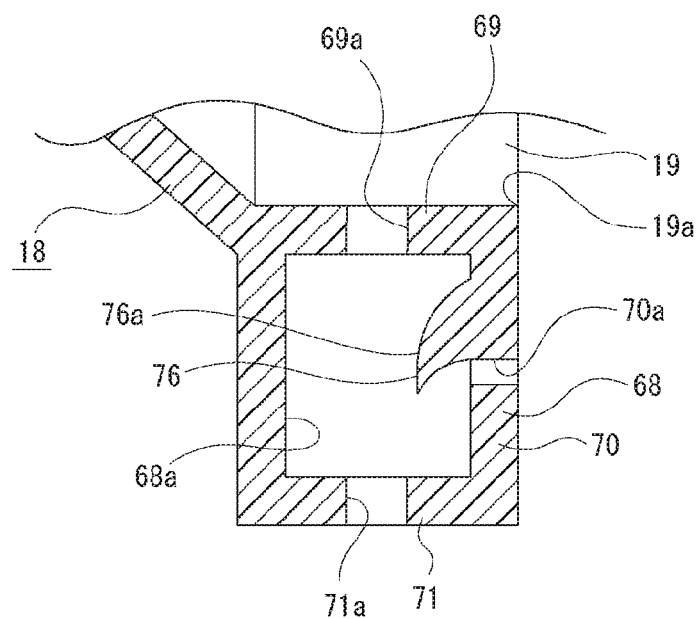
FIG. 44 is a sectional view showing an example in which a blocking prevention portion is provided on the inner surface side of the peripheral surface portion of the water reservoir case.

Here, when the water droplets introduced from the injection port 19a reach the air inlet hole 70a along the inner surface of the peripheral surface portion 70, there is a possibility that the air inlet hole 70a is closed by the water droplets and the above-described pressure difference in the upper and lower direction does not occur. Therefore, it is preferable that a blocking prevention portion 76 for preventing the blockage of the air inlet hole 70a due to water droplets is provided on the inner surface side of the peripheral surface portion 70 (see FIG. 44).

For example, the blocking prevention portion 76 protrudes inward from an upper position of the portion of the peripheral surface portion 70 in which the air inlet hole 70a is formed. The blocking prevention means 76 has a lower end positioned below the air inlet hole 70a (see FIG. 45). An inclined surface 76a on which water droplets flow is formed in the blocking prevention portion 76.

Since water droplets are caused to flow downward on the inclined surface 76a and dropped on the bottom surface portion 71 when the blocking prevention portion 76 is provided, the blockage of the air inlet hole 70a due to the water droplets is prevented and the pressure difference in the upper and lower direction of the injection portion 19 is maintained. In this way, the water droplets can be smoothly guided to the inside of the water reservoir case 68.

Figure 45:
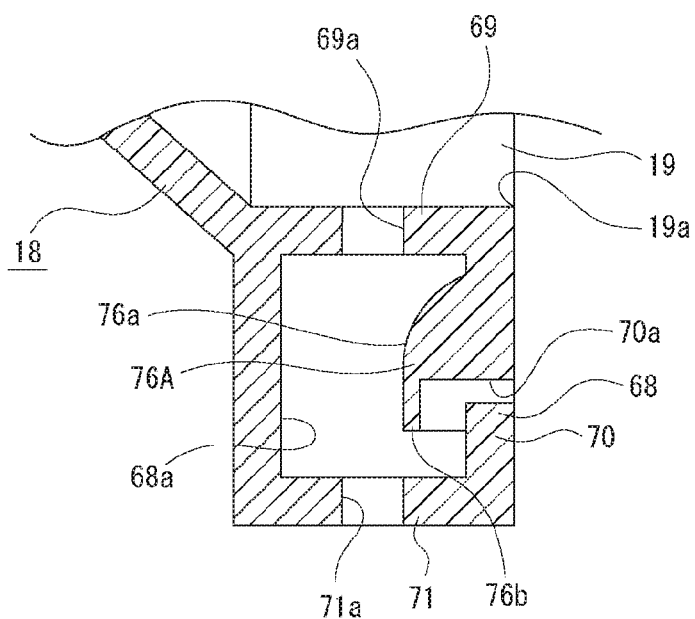
FIG. 45 is a sectional view showing an example in which another blocking prevention portion is provided on the inner surface side of the peripheral surface portion of the water reservoir case.

Further, a blocking prevention portion 76A may be provided on the inner surface side of the peripheral surface portion 70 (see FIG. 45). The blocking prevention portion 76A is provided at its lower end portion with a lower protruding portion 76b protruding downward. Since the lower end of the blocking prevention portion 76A is largely separated downward from the air inlet hole 70a when the lower protruding portion 76b is provided on the blocking prevention portion 76A, it is possible to reliably prevent the blockage of the air inlet hole 70a due to the water droplets.

Figure 46:
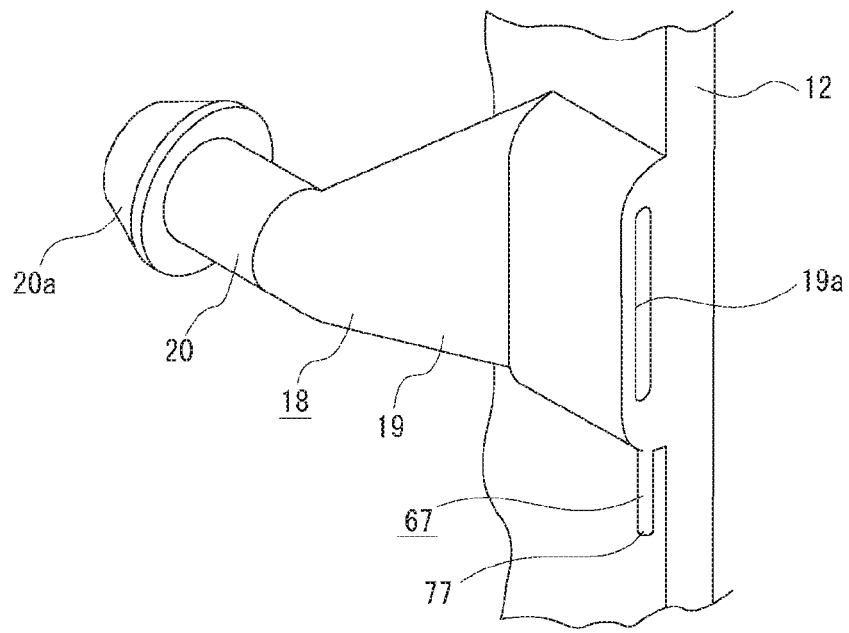
FIG. 46 is a perspective view showing an example in which a guide bar is provided as the water droplet guide portion.

Although an example where the water reservoir case 68 is provided as the water droplet guide portion 67 has been described above, a guide bar 77 may be provided as the water droplet guide portion (see FIG. 46).

The guide bar 77 is provided continuously to a lower end portion of an opening edge of the injection port 19a of the injection portion 19 and is formed, for example, in a rod-like shape extending in the upper and lower direction.

In the vehicle lamp 1 provided with the guide bar 77, when water droplets are adhered to the opening edge of the injection port 19a, the adhered water droplets flow from the opening edge to the guide bar 77 and drops along the guide bar 77.

When the guide bar 77 continuing to the opening edge of the injection port 19a of the injection portion 19 is provided as the water droplet guide portion 67 in this way, the water droplets are dropped along the guide bar 77. Therefore, it is possible to suppress the intrusion of water droplets to the deep side of the injection portion 19 without increasing the number of parts.

Figure 47:
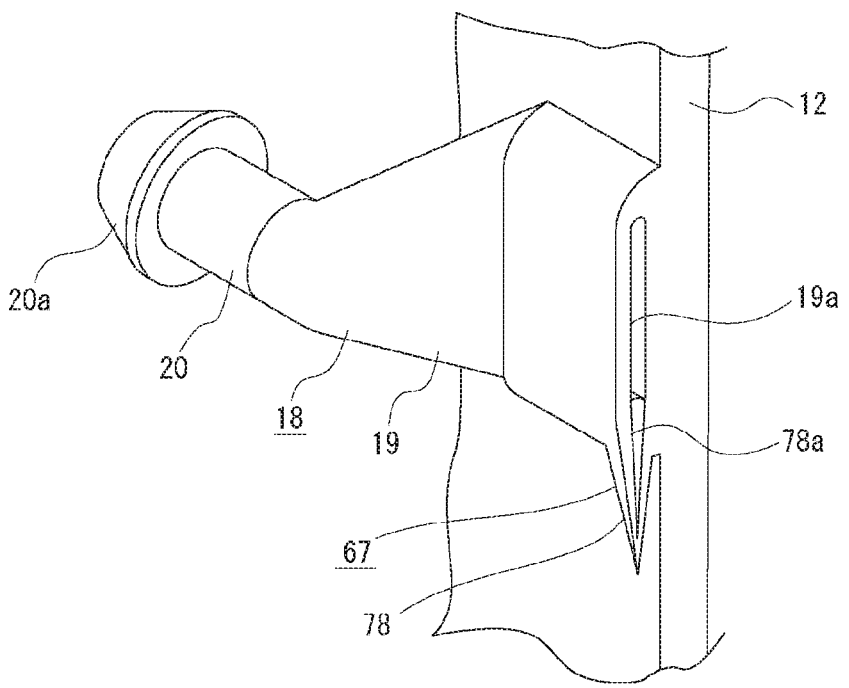
FIG. 47 is a perspective view showing an example in which another guide bar is provided as the water droplet guide portion.

Further, instead of the guide bar 77, a guide bar 78 whose width decreases downward may be provided in the injection portion 19 (see FIG. 47). The guide bar 78 is formed in a substantially inverted triangular shape which extends in the upper and lower direction and whose width decreases downward. A groove portion 78a whose width decreases downward is formed in the surface of the guide bar 78 on the side opposite to the side surface 102 of the vehicle body 101. An upper end of the groove portion 78a coincides with a lower end of the injection port 19a.

In the vehicle lamp 1 provided with the guide bar 78, when water droplets are adhered to the opening edge of the injection port 19a, the adhered water droplets flow from the opening edge to the guide bar 78 and, particularly, drop along the groove portion 78a.

Since the width of the groove portion 78a decreases downward when the guide bar 78 is used, the water droplets are combined as going downward and the weight thereof increases. In this way, the water droplets can be reliably dropped by the guide bar 78.

When the water droplet guide portion 67 for guiding water droplets is provided in the injection portion 19 as described above, water droplets are guided by the water droplet guide portion 67 and the intrusion of the water droplets to the deep side of the injection portion 19 is suppressed. In this way, the injection of fluid is not obstructed by the water droplets, so that it is possible to secure a good injection operation of fluid.

Next, a control for the injection operation of fluid in the vehicle lamps 1, 1 will be described (see FIGS. 21, 48, 49, and 50).

As described above, the foreign substance removal system 80 is provided in the vehicle 100. The foreign substance removal system 80 includes the fluid supply source 40 such as the pump described above, the hose 39 through which fluid flows, and the vehicle lamps 1, 1 to which fluid is supplied via the hose 39 (see FIG. 21).

Figure 48:
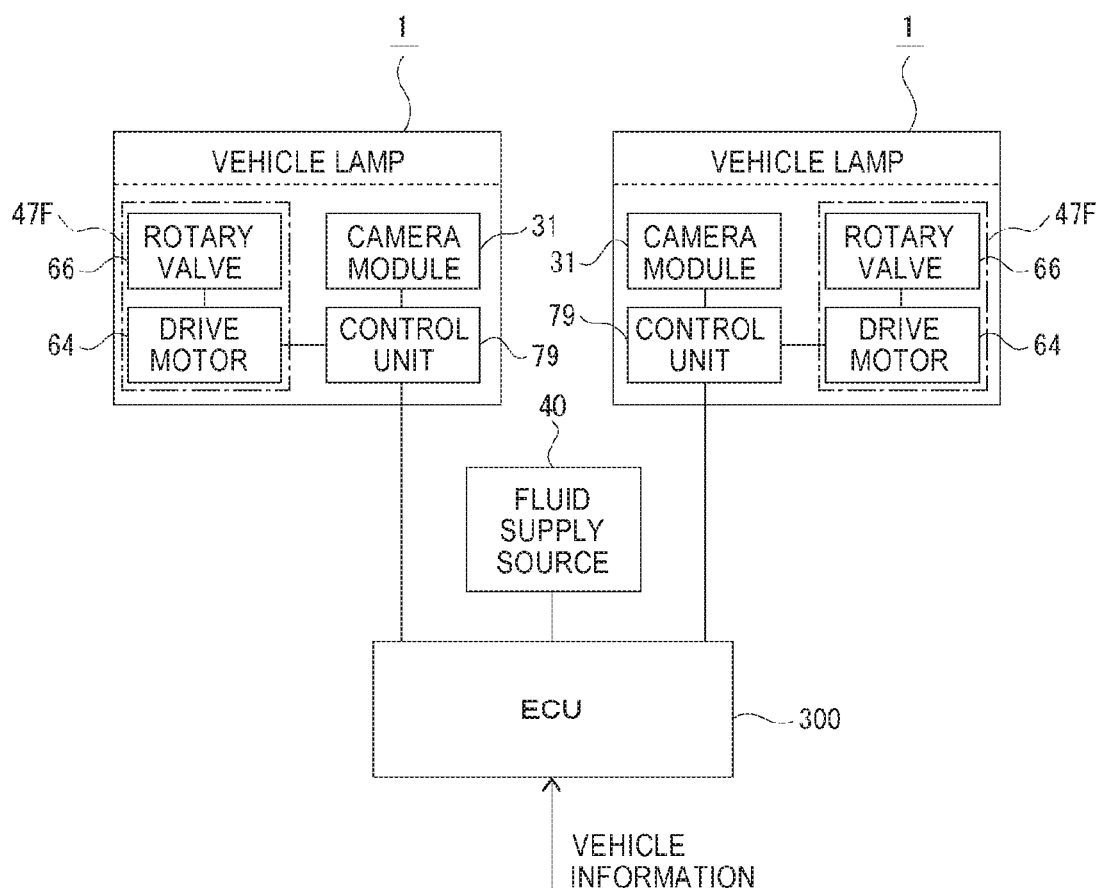
FIG. 48 is a block diagram relating to a foreign substance removal system for a vehicle.

The fluid supply source 40 is controlled by the ECU 300 to which respective information (vehicle information) on the vehicle 100) is inputted (see FIG. 48). Further, the fluid injection control with respect to the vehicle lamps 1, 1 is performed on the basis of a command from the ECU 300.

In addition, the vehicle lamps (vehicle imaging devices) 1, 1 as objects from which foreign substances are removed are not limited to a pair of left and right same types but may be combinations of different types. Further, the number of vehicle lamps (vehicle imaging devices) 1 as objects from which foreign substances are removed is not limited to two but may be three or more. For example, a pair of left and right side turn signal lamps with built-in camera module and a rear combination lamp with built-in camera module may be combined and an image capturing system for back view monitoring may be additionally combined.

The vehicle lamps 1, 1 are provided with control units 79, 79, respectively. The control units 79, 79 are operated on the basis of a command from the ECU 300. The camera modules 31, 31 and the drive motors 64, 64 of the vehicle lamps 1, 1 are controlled by the control units 79, 79, respectively. Specifically, the image capturing operation and the like of the camera modules 31, 31 is performed by the control operation of the control unit 79. The start or stop of rotation of the drive motors 64, 64 in the backflow prevention mechanisms 47F, 47F is performed by the control operation of the control unit 79.

In addition, an image capturing system for back view monitoring may be provided in the vehicle 100. The operation of this image capturing system is also controlled by the ECU 300.

As described above, in the foreign substance removal system 80, the drive motors 64, 64 are controlled by the control unit 79, 79. For example, the injection control on one side is performed at a predetermined timing as follows.

Figure 49:
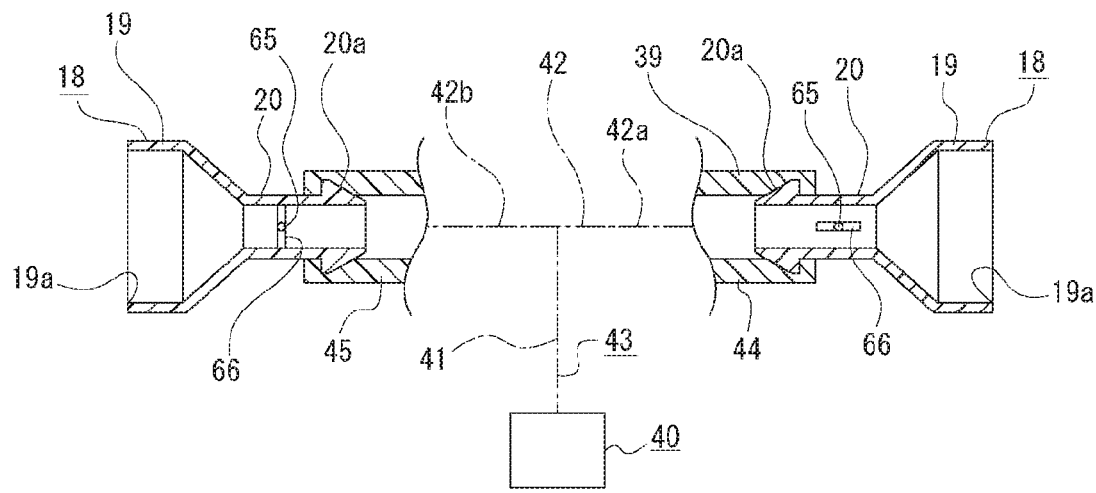
FIG. 49 is a conceptual diagram showing an example in which one of the flow paths is opened by the rotary valve and the other of the flow paths is blocked by the rotary valve.

For example, the rotary valve 66 is rotated to the opened position by the operation of one of the drive motors 64, and the rotary valve 66 is rotated to the closed position by the operation of the other of the drive motors 64 (see FIG. 49). Therefore, the flowing space 18a of one of the nozzles 18 is opened by one of the rotary valves 66, and the flowing space 18a of the other of the nozzles 18 is closed by the other of the rotary valves 66. One of the flow path 43a of the first supply part 44 and the flow path 43a of the second supply part 45 is closed and the other is opened.

In this manner, in the vehicle lamp 1, for example, the flow path 43a is opened and closed by the rotary valves 66 of the backflow prevention mechanisms 47F, 47F. Therefore, the backflow prevention mechanisms 47F, 47F function as an opening and closing mechanism for opening and closing the flow path 43a.

At this time, when fluid is supplied from the fluid supply source 40 to the hose 39, the fluid is injected from the injection port 19a toward the transmission window 23a of one of the vehicle lamps 1 via the flowing space 18a opened by one of the rotary valves 66, and no fluid is injected to the transmission window 23a of the other of the vehicle lamps 1. Therefore, foreign substances such as water droplets or dust adhered to the transmission window 23a of one of the vehicle lamps 1 are removed by being blown off by the fluid.

In this manner, in the vehicle lamp 1, the fluid is injected in a state where one of the flow path 43a of the first supply part 44 and the flow path 43a of the second supply part 45 is closed and the other is opened. Therefore, the pressure loss of fluid is reduced, and efficient injection operation of fluid can be secured.

Further, since the fluid is injected in a state where one of the flow path 43a of the first supply part 44 and the flow path 43a of the second supply part 45 is closed and the other is opened, accordingly, it is possible to reduce the flow rate of fluid, and it is possible to reduce the size of the fluid supply source 40.

Furthermore, since one of the flow path 43a of the first supply part 44 and the flow path 43a of the second supply part 45 is closed, it is possible to suppress the intrusion of foreign substances such as water droplets and dust from the injection port 19a into the flow path 43a on the closed side.

Moreover, in the vehicle lamp 1, the backflow prevention mechanisms 47F, 47F functioning as opening and closing mechanisms for opening and closing the flow path 43a are arranged in the first supply part 44 and the second supply part 45, respectively.

In this way, since the flow path 43a of the first supply part 44 and the flow path 43a of the second supply part 45 are opened and closed by the respective opening and closing mechanisms, the blowing of fluid to each of the vehicle lamps 1, 1 and the stop of the blowing are carried out, as necessary. Therefore, it is possible to reduce the pressure loss of fluid as required and it is possible to secure efficient injection operation of fluid as required.

Additionally, as the opening and closing mechanism, the shaft 65 rotating in the direction around its axes, the drive motor 64 functioning as a drive source for applying a driving force to the shaft 65, and the rotary valve 66 rotating in accordance with the rotation of the shaft 65 to open and close the flow path 43a are provided.

In this way, the flow path 43a is opened and closed in accordance with the rotational position of the shaft 65.

Therefore, by controlling the rotation of the shaft 65 as required, it is possible to secure a good injection operation of fluid and it is possible to suppress the intrusion of foreign substances into the injection port 19*a*.

By the way, in order to capture a good image by the camera module, a foreign substance removal system for a vehicle may be provided to blow off foreign substances such as water droplets and suppress the adhesion of foreign substances by blowing fluid onto the portion of the translucent cover, through which image capturing light is transmitted.

However, since the foreign substance removal system is disposed inside the vehicle together with various other components such as an engine, it is desirable to secure the simplification of the structure in the necessity of avoiding the interference with other components or improving the fuel economy by reducing the weight of the vehicle.

Therefore, in the foreign substance removal system of the disclosure, it is also preferable to simply the structure.

As described above, in the foreign substance removal system 80, the fluid supplied from the fluid supply source 40 to the first supply part 44 is blown onto the transmission window 23*a* of one of the vehicle lamps 1, and the fluid supplied from the fluid supply source 40 to the second supply part 45 is blown onto the transmission window 23*a* of the other of the vehicle lamps 1.

Therefore, fluid can be blown onto the transmission windows 23*a*. 23*a* of the two vehicle lamps 1, 1 from the single fluid supply source 40, thereby simplifying the structure.

Further, since one fluid supply source 40 is not required for each of the vehicle lamps 1, 1, accordingly, it is possible to reduce the manufacturing cost of the foreign substance removal system 80 and reduce the size and weight thereof.

Further, since the drive motor 64 is disposed inside the vehicle lamp 1, there is a possibility that vibration occurs when the drive motor 64 is driven. However, it is possible to provide a structure for suppressing the occurrence of vibration inside the vehicle lamp 1.

As the structure for suppressing the occurrence of vibration, for example, the drive motor 64 may be connected to the substrate 28 by a flexible printed wiring board, and the occurrence of vibration may be suppressed by utilizing the flexibility of the flexible printed wiring board. Further, for example, in the structure in which the drive motor 64 is coupled to the substrate 28 made of resin, the drive motor 64 may be coupled to the substrate 28 via a conductive gel material, and vibration may be absorbed by the gel material.

Meanwhile, the one-sided injection control in which fluid is injected to the transmission window 23*a* of one of the vehicle lamps 1 but fluid is not injected to the transmission window 23*a* of the other of the vehicle lamps 1 by opening one of the first supply part 44 and the second supply part 45 and closing the other as described above is alternately performed at predetermined time intervals for the left and right vehicle lamps 1, 1, for example.

Here, the one-sided injection control may be performed as follows depending on the situation.

For example, when the adhesion amount of foreign substances on one of the transmission windows 23*a* is larger than the adhesion amount of foreign substances on the other of the transmission windows 23*a*, it is possible to allow the fluid to be blown preferentially on the one of the transmission windows 23*a*. In this case, for example, a sensor for detecting the state of the images on the displays 200, 200 or a sensor for detecting the state of the transmission window 23*a*, 23*a* can be provided, and the one-sided injection control can be performed in accordance with the detection results of the sensor. Further, when the sensor is not provided, a passenger of the vehicle 100 can visually confirm the images on the displays 200, 200, and the one-sided injection control can be performed by the operation of the passenger.

Further, when a passenger (driver) of the vehicle 100 wises to confirm the outside of the vehicle by the camera module 31 provided in one of the vehicle lamps 1, the one-sided injection control may be performed by the operation of the passenger. As the examples of wishing to confirm the outside of the vehicle, there are the cases in which the vehicle 100 turns to the left side or right side, in which the vehicle 100 changes its lane, in which the vehicle 100 merges at the intersection, in which the vehicle 100 moves backward or in which an emergence vehicle approaches the vehicle 100, or the like. In these cases, instead of using the operation of the passenger, a system for predicting the right or left turn, the lane changing, the merging or the backward movement of the vehicle 100 or the approaching of the emergency vehicle or the like immediately before these operations is provided in the vehicle 100, and the one-sided injection control may be performed on the basis of a signal from this prediction system.

Meanwhile, although each example where the one-sided injection control in which fluid is injected to one of the transmission windows 23*a* is performed has been described above, both-sided injection control in which fluid is simultaneously injected to the transmission windows 23*a*, 23*a* of both vehicle lamps 1, 1 may be performed in the vehicle 100.

Figure 50:
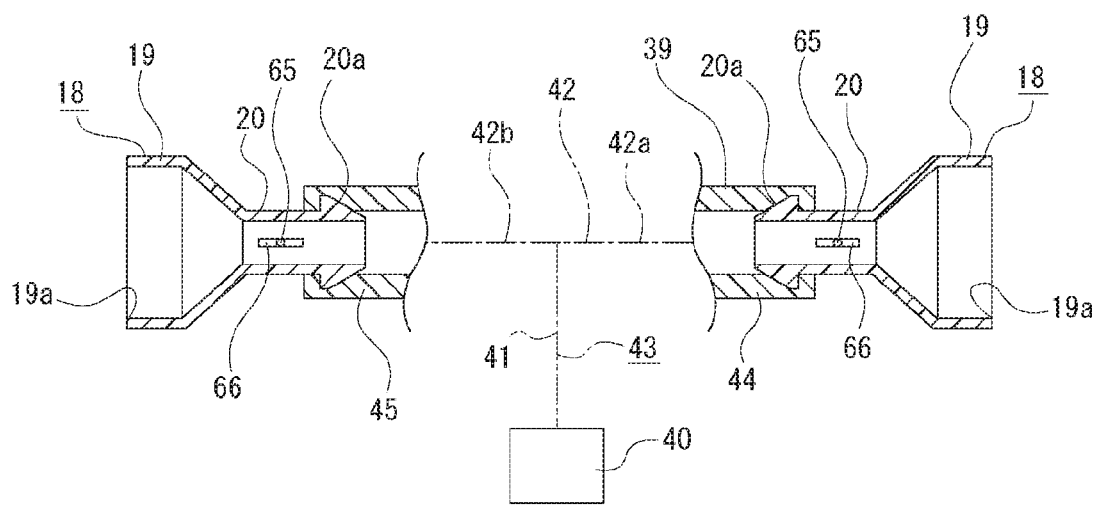
FIG. 50 is a conceptual diagram showing an example in which both of the flow paths are opened by the rotary valve.

For example, in the case where the backflow prevention mechanisms 47F, 47F are provided, both-sided injection control is performed by supplying fluid from the fluid supply source 40 in a state where the rotary valves 66, 66 are respectively rotated to the opened position by the operation of the drive motors 64, 64 (see FIG. 50).

Meanwhile, instead of the case where the backflow prevention mechanism 47F is provided, the both-sided injection control may be performed even in the cases where other mechanisms such as the backflow prevention mechanisms 47, 47A, 47B, 47C, 47D, 47E are provided.

Further, the injection of fluid to the transmission window 23*a* may be performed in conjunction with a wiper, a vehicle speed, an input to a back gear, turning on of an ignition switch, detection of a water pool around the vehicle 100, rainfall, turning on of a turn signal lamp, or detection of pedestrians or other vehicles around the vehicle 100, or the like.

REFERENCE NUMERALS LIST

1 . . . Vehicle Lamp (Vehicle Imaging device), 2 . . . Housing, 3 . . . Translucent Cover, 4 . . . Outer Casing. 19*a* . . . Injection Port, 23*a* . . . Transmission Window, 27 . . . Restriction Portion, 27*a* . . . First Wall Portion, 27*b* . . . Second Wall Portion. 30 . . . Light Emitting Element. 31 . . . Camera Module, 46 . . . Passing Hole

What is claimed is:

1. A vehicle imaging device comprising:
   an outer casing comprising a housing having an opening and a translucent cover closing the opening; and
   a camera module disposed inside the outer casing,
   wherein a part of the translucent cover is provided as a transmission window through which image capturing light to be incident on the camera module is transmitted, wherein the translucent cover is provided with a restriction portion
wherein the restriction portion comprises a protruding portion or a groove portion formed in the translucent cover, the protruding portion or groove portion configured to restrict the intrusion of water droplets into the transmission window;
wherein an injection port of fluid to be blown onto the transmission window is formed in the housing, and
wherein the restriction portion is provided on the side opposite to the injection port with the transmission window interposed therebetween in an injection direction of the fluid.

2. The vehicle imaging device according to claim 1,
wherein the restriction portion is formed in a protruding shape.

3. The vehicle imaging device according to claim 1,
wherein the restriction portion is provided around the transmission window.

4. The vehicle imaging device according to claim 1,
wherein the restriction portion has a first wall portion located on the side opposite to the injection port with the transmission window interposed therebetween in the injection direction of the fluid, and a second wall portion located at least one of above and below the transmission window.

5. A vehicle lamp comprising:
the vehicle imaging device according to claim 1, and
a light emitting element provided as a light source and disposed inside the outer casing.

\* \* \* \* \*